United States Patent
Wong

(10) Patent No.: US 7,035,443 B2
(45) Date of Patent: Apr. 25, 2006

(54) PERSONAL CHOICE BIOMETRIC SIGNATURE

(76) Inventor: Jacob Y. Wong, 7110 Georgetown Rd., Goleta, CA (US) 93117

( * ) Notice: Subject to any disclaimer, the term of this patent is extended or adjusted under 35 U.S.C. 154(b) by 855 days.

(21) Appl. No.: 10/150,063

(22) Filed: May 20, 2002

(65) Prior Publication Data
US 2003/0179910 A1 Sep. 25, 2003

Related U.S. Application Data

(60) Provisional application No. 10/102,667, filed on Mar. 22, 2002.

(51) Int. Cl.
*G06K 9/00* (2006.01)
(52) U.S. Cl. .................. 382/124; 340/5.83; 902/3
(58) Field of Classification Search .............. None
See application file for complete search history.

(56) References Cited

U.S. PATENT DOCUMENTS

| | | | | |
|---|---|---|---|---|
| 5,363,453 | A * | 11/1994 | Gagne et al. | 382/125 |
| 6,393,139 | B1 * | 5/2002 | Lin et al. | 382/124 |
| 6,459,804 | B1 * | 10/2002 | Mainguet | 382/124 |
| 6,483,932 | B1 * | 11/2002 | Martinez et al. | 382/124 |
| 2003/0123714 | A1 * | 7/2003 | O'Gorman et al. | 382/124 |

* cited by examiner

Primary Examiner—Samir Ahmed
Assistant Examiner—Charles Kim

(57) ABSTRACT

A biometric method and system for personal authentication using sequences of partial fingerprint signatures provides a high security capability to various processes requiring positive identification of individuals. This approach is further enhanced by employing a frequency domain technique for calculating a Similarity Index of the partial fingerprint signatures. In a baseline usage, the sequential partial fingerprint sequence techniques augments sentinel systems for gaining access to restricted areas, and when used in combination with financial cards, offer a unique and greatly simplified means for authenticating or identifying individuals. A highly automated technique initially obtains a reference set of linear partial fingerprint signatures which serve as reference data against which later proffered candidate data in the form of at least two linear partial fingerprint signatures are compared for authentication. The particular two candidate signatures used and the sequence in which they are submitted are selected with the user's consent and serve as a PIN-like unique personal code. In an advanced embodiment, a pair of proximity sensors located along each of the linear tracks used for developing the linear partial signatures produce finger sensing signals which compensate for finger movement speeds and hence significantly improves the calculated Similarity Index values. The use of only partial fingerprint data greatly allays the concerns of widespread fingerprint dissemination by many individuals.

11 Claims, 12 Drawing Sheets

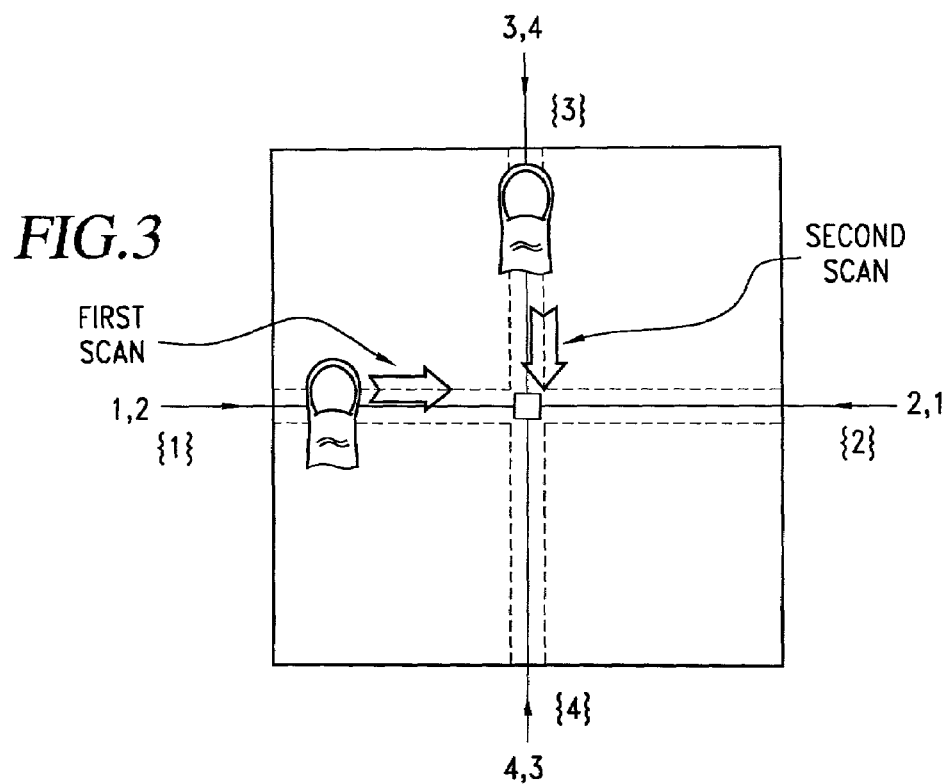
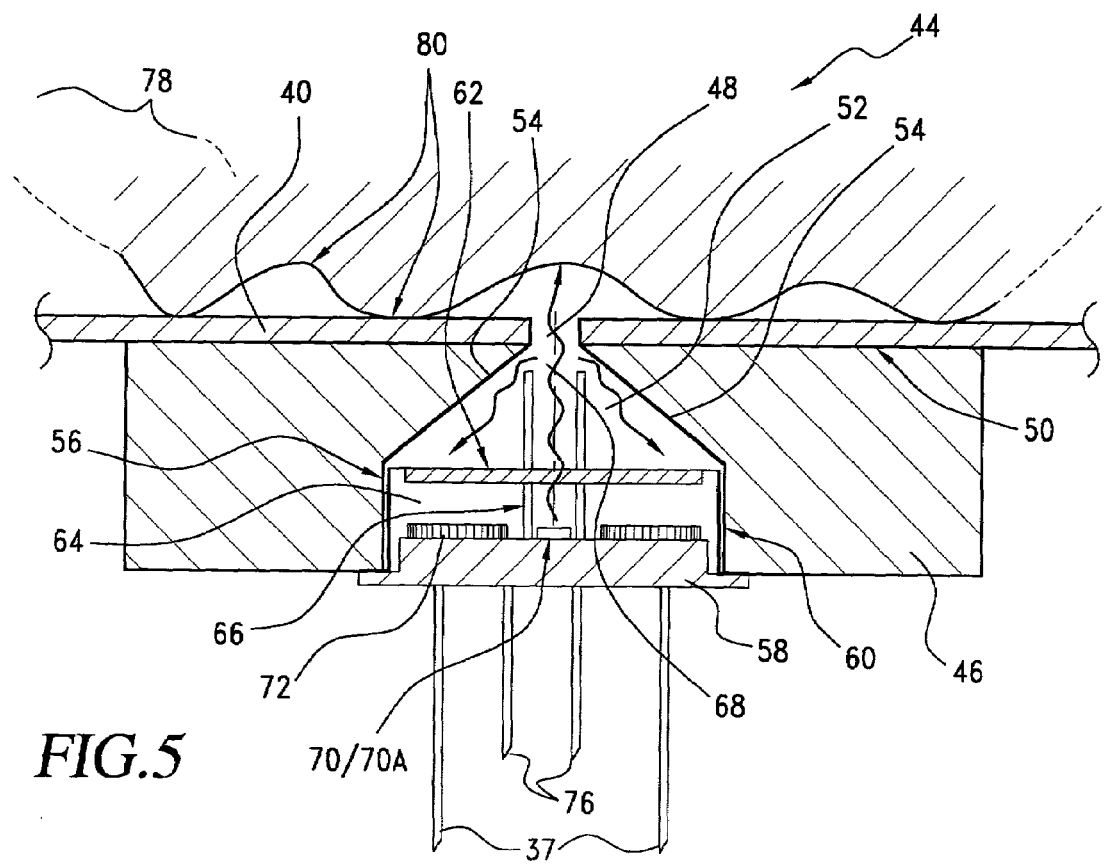

PERSONAL CHOICE BIOMETRIC SIGNATURE

CROSS-REFERENCE TO RELATED APPLICATIONS

The present application is a Continuation-in-Part of a U.S. Non-Provisional Patent Application filed on Mar. 22, 2002 entitled "Personal Choice Biometric Signature," which has been accorded U.S. application Ser. No. 10/102,667, and is incorporated by reference in full herein.

TECHNICAL FIELD

The present invention relates generally to the field of personal authentication. In particular, this invention pertains to a comparison method of utilizing a specific sequence of an individual's linear partial fingerprint signatures selected by a Personal Code as a basis of comparison for the authentication or identification of the individual in question, and especially to an improved fingerprint-taking template device having proximity sensors.

BACKGROUND

In the complex society that we are living in, there are numerous occasions where individuals have to authenticate themselves by means other than personal recognition. Until recently, a common approach to this has been the issuance of personal identification cards which range in complexity depending on the purpose for which they are to be used. For situations that are deemed only of secondary importance, the cards may merely contain the individual's name, signature and an identification number. Here, the presentation of the card will be proof enough of the user's identity if the card signature matches that of the user's as taken at the time of use. For situations that require a more positive identification, such cards are also provided with the individual's photograph, as in the case for driver's licenses and passports.

Unfortunately, these identification instruments have become the common victims of illegal falsification and duplication. The rampant credit card fraud of recent years has certainly accentuated the inadequacy of using such personal instruments to authenticate oneself in many instances. To this end when bank-issued ATM cards were finally accepted and used by the American public in large numbers in the middle 1980's, a new identification means was introduced in the form of what is now called a PIN number, or Personal Identification Number, which typically takes the form of an easily-memorisable 4-digit decimal number.

Even though there exist superior ways and methods for use in identifying or authenticating an individual, particularly those that use one's natural body codes such as faces, fingerprints, retina patterns, irises and voice prints, they have only been deployed to date in highly special circumstances where the absolute security of one's identity warrants the additional complexity. Indeed the use of fingerprints to identify unique individuals has been around for well over a hundred years. Either "rolled" fingerprint or "flatly placed" fingerprint inked impressions are commonly used and the identification can be classified as "passive" because the individual is not required to perform any finger motions during the subsequent process of identification. As is well-known, in collecting the so-called "rolled" fingerprint impressions, an individual's inked thumb or other fingers is rotated from one side of the nail to the other so that the entire pattern area can be printed on paper. Characteristic features or patterns of fingerprints such as "arches", "loops" and "whorls" (referred to as keys) are routinely employed by fingerprint-identifying technicians to define fingerprint patterns for easier comparison and identification of them. The so-called Henry classification system is often used to determine if two prints are the same even though this system requires a skilled expert to compare the individual characteristics of the prints.

The classical approach of using fingerprints to identify individuals, albeit among one of the best known to date, is nevertheless rather complex and may require elaborate optical instruments such as high-power microscopes for detailed fingerprint pattern examinations. Collection of inked fingerprint impressions can be rather messy and also takes operator skill and a finite amount of time in order to do an adequate job. As mentioned above, identification of fingerprints belonging to unique individuals using comparison methods requires trained experts or experienced technicians. Furthermore identification of individuals via fingerprint matching is not really an exact science and is by no means 100% objective or accurate. Added to all these is the fact that an individual's fingerprints are not safe or fully protected from fraudulent use because most people frequently and inadvertently leave behind fingerprints while performing their daily routines. These fingerprints can be willfully recovered for illegal use as falsified personal identifications.

Not surprisingly, not all people feel comfortable in submitting their fingerprints for their personal identification such as credit cards, employee entrance cards in workplaces etc. except for very serious matters such as extreme security check for sensitive federal appointments or for crime solving. One important reason behind this is the fact that there is an undesirable stigma of "criminal nature" associated with the use of fingerprints as a method of identification. Replacing specially trained and experienced fingerprint-identifying technicians requires the use of very complicated detection machines equipped with complex processing algorithms. These equipment are therefore necessarily expensive. Still, in an effort to try to thwart the rampant credit card fraud, proposals have been advanced over the past several years to utilize one's fingerprint as a more secure way of authenticating credit card holders. The use of fingerprints along with the use of the so-called "smart cards", namely cards that encapsulate a secure smart integrated circuit (IC) chip in the plastic in lieu of the fraud-prone magnetic stripe for storing sensitive and personal financial data, would surely eliminate once and for all the credit card fraud problem existing today. The development of the so-called biometric smart card using fingerprint template identification has been on-going for a number of years but unfortunately is still far from being a reality because of credit card size and the cost constraints of this method, in addition to having to overcome very difficult technical challenges.

However, the technical obstacles that have been encountered to date in the implementation of the full-blown fingerprint identification approach in the biometric smart card should not be the determining factor in deciding whether or not this venerable identification method should be deployed in the future. Furthermore, the deployment of the retina pattern, iris and the voice print as better and alternate ways to identify individuals will likely encounter the same constraint problems in size, cost and technical challenge without the benefit of a head start like the use of fingerprints. Today the rampant credit card fraud problem has not gone away. As a matter of fact, the problem grows worse and more serious everyday that passes. Thus there presently exist ample reasons why a new and better methodology is needed in order to exploit the use of fingerprints as a secure way of authenticating individuals, especially in circumstances of primary importance like access to restricted area or restricted information, or authorization of credit cards, without the existing encumbrances of using fingerprints for identification as discussed earlier above.

Ample prior art can be found in fingerprint detection apparatus and methodology of using fingerprints for personal authentication and identification. A list of earlier issued U.S. patents relating to the prior art has been presented in U.S. application Ser. No. 10/074,011 filed Feb. 14, 2002 for "Authentication Method Utilizing a Sequence of Linear Partial Fingerprint Signatures Selected by a Personal Code", of which the present application is a second generation continuation-in-part. Additional prior art dealing with two-dimensional fingerprint images, their acquisition methodology and apparatus, and their classification, interpretation and comparison are presented as follows.

In U.S. Pat. No. 5,933,515 issued to Pu et al. in 1999, an identification system using biometric information of human body parts and a secret sequence code was advanced. In particular, biometric information of human body parts is used to form the secret sequence code. Specifically, a combination entry device recognizes user's fingerprints which are entered as a sequence. The fingerprints must be entered in the proper sequence in order to be recognized by the system. Although in principle this invention has a lot of merit and was among the first to introduce the concept of giving an individual a choice in how to use his biometric information as a way of his identification, only the use of different complete fingerprints to form the biometric sequence was taught. Thus the implementation of this teaching is in reality extremely cumbersome and time consuming and it is certainly not amenable to simple and low-cost realization in order to be universally practical.

In U.S. Pat. No. 5,982,913 issued to Brumbley et al. in 1999, a method of fingerprint verification was advanced that includes the steps of capturing a complete fingerprint of a number of enrollees; capturing a portion of a claimant's fingerprint, where the portion is less than an entire fingerprint; dividing the portion of the claimant's fingerprint into a number of segments; comparing each of the segments against the fingerprint of the enrollee the claimant claims to be; generating a correlation score for each of the segments; calculating a distance error for the segments; combining the distance errors into an average distance error; generating a verification vector based on each of the correlation scores for each of the segments and the distance error; establishing a threshold vector; and comparing the verification vector against the threshold vector in order to determine whether or not the claimant is the enrollee the claimant claims to be. It is clear that the primary objective of the inventors is to simplify the fingerprint verification process by devising means for comparing portions of a complete fingerprint with a complete reference fingerprint. The means used to achieve this objective are still overly complicated and are not easily amenable to simple and low-cost implementation.

In U.S. Pat. No. 6,226,391 issued to Dydyk et al. in 2001, a method and apparatus for automatically placing a first unknown image, such as an unknown fingerprint image, into one of a plurality of categories. The invention includes storing in a library a plurality of value series, each of which series is derived from the frequency representation of an image category. The categorization process and apparatus takes the frequency image of a first unknown pattern to create a first frequency image the frequency image plane of the first (unknown) frequency image is divided into a plurality of frequency image plane regions. Each of the frequency image plane regions may be an angular segment radiating from the origin of the frequency image plane. A region value is assigned to each of the frequency image plane regions based on the total energy in the frequency image in that region. The region values for the first frequency image are combined to generate a first series of region values. The first series of region values is compared in a comparator with each of the stored value series. The comparator preferably performs a correlation function on the pattern or series of the regional values using the one dimensional frequency transform of the spatial representation of the pattern or series of regional values.

Although this invention discloses the concept of fingerprint classification using spatial frequency representation, correlation functions and one-dimensional frequency transform, the apparatus advanced to generate the frequency image of an unknown pattern in order to utilize such a classification methodology is rather complex and is certainly not amenable to simple and low-cost implementation.

In U.S. Pat. No. 6,241,288 issued to Bergenek et al. in 2001, a novel fingerprint identification/verification system was disclosed. This system uses bitmaps of a stored fingerprint to correlate with a bit map of an input fingerprint, wherein an accurate reference point is located. This is followed by the selection of several two-dimensional areas in the vicinity of the reference point of the input image of the fingerprint. These areas are then correlated with stored fingerprint recognition information to determine if the input fingerprint image and the stored fingerprint recognition information are sufficiently similar to identify/verify the input fingerprint. It can be seen from this brief summary of the patent, the teaching of this invention is very complex and unlikely to be able to be implemented simply and in a low-cost manner.

Additional teachings of fingerprint identification systems and methods of related interest, particularly in the use of Fast Fourier Transform techniques for 2-dimensional fingerprint image analysis may be found in other U.S. Patents, including—U.S. Pat. No. 5,910,999 issued to Mukohzaka in 1999; U.S. Pat. No. 5,915,034 issued to Nakajima et al. in 1999; U.S. Pat. No. 5,999,637 issued to Toyoda et al. in 1999; U.S. Pat. No. 6,024,287 issued to Takai et al. in 2000; U.S. Pat. No. 6,075,876 issued to Draganoff in 2000; U.S. Pat. No. 6,094,499 issued to Nakajima et al. in 2000; U.S. Pat. No. 6,341,028 issued to Bahuguna et al. in 2002; and US 2002/0018585 A1 issued to Kim in 2002. Beyond the Fourier Transform prior art of interest, other prior U.S. patents pertaining to the proximity sensing aspect of the present invention are as follows.

U.S. Pat. No. 4,784,484 to Jensen discloses methods and apparatus for optically scanning fingerprints wherein a finger is moved over a stationary optical line scanner and a measuring circuit produces two times derived from a pair of wires which are beneath the moving finger path. The scanning line may be placed between two of the measuring wires.

U.S. Pat. No. 6,759,804 to Setlak et al. discloses using a finger pressure sensor to control power application to active fingerprint sensing circuitry. Also, U.S. Pat. No. 6,360,004 to Akizuki discloses the use of a touch pad to detect the position of finger contact, while U.S. Pat. No. 5,635,723 to Fujieda et al. discloses the use of force responsive springs to initiate fingerprint sensing circuitry.

There is hardly any doubt that the prior art summarized above and those presented in the aforementioned U.S.

application Ser. No. 10/074,011 have made significant progress towards simplifying the overall mechanics for the acquisition, classification and comparison of fingerprints. They have also removed in some cases the subjectivity and ambiguity in the employment of the well-known Henry classification system to determine if two prints are the same. However, the conventional thinking of using the entirety or even portions of one's complete fingerprint on a comparison basis with stored counterparts to authenticate oneself is still today far too complex a task to accomplish simply and economically, despite the availability of clever correlation methods and high-power mathematical tools.

The approach taken by the aforementioned U.S. applications and the present continuation-in-part represent major departures from such thinking. Certain specific and well-defined partial fingerprints (e.g. linear or straight line segments) belonging to an individual are now looked upon as his biometric signatures and he has a choice of using linear signatures in a self-chosen sequence for his unique authentication. Unlike one's written signature in the past which was used for his identification but suffered from frequent illegal falsification and duplication, today one's written signature can be replaced by a so-called Personal Choice Biometric Signature (PCBS) or sequential linear signatures by choice which can neither be duplicated nor falsified for fraud. The reason for advancing this new kind of thinking is that comparing an individual's entire fingerprint against one's stored complete fingerprint is not cost effective in low-cost applications including smart card systems primarily because of the size and expense of the scanner required to capture an entire fingerprint and partly because of the amount of memory required to store and process one's entire fingerprint.

OBJECTS AND SUMMARY OF THE INVENTION

It is therefore a primary object of the present invention to provide methods and apparatus for verifying or authenticating the identity of individuals using only partial fingerprint data.

A further object of the present invention is to provide methods and apparatus for verifying or authenticating the identity of individuals using frequency domain techniques applied to partial fingerprint data wherein this data may readily be time scaled to refine the frequency domain processing.

A yet further object of the present invention is to provide improved high security methods and systems for personal authentication or identification using sequences of partial fingerprints (linear signatures) selected by a personal code, whereby this data may be readily time scaled using proximity sensors.

A still further object of the present invention is to provide a method of verifying or authenticating the identity of individuals using a sequence of at least two partial fingerprints (linear signatures) taken from a group of more than two linear signatures where the particular two used, as well as the particular sequence in which they are used, is arranged to constitute a PIN-like user's personal code, whereby the linear signature data may be readily time scaled using proximity sensors.

A still further object of the present invention is to provide a system comprising a Selective Partial-fingerprint Authenticator (SPA) which includes pairs of proximity sensors and accompanying novel software algorithm for first obtaining and processing a reference set of partial fingerprints (linear signatures) from an individual and subsequently a candidate set of at least two partial fingerprints (linear signatures) from that individual in order to authenticate the individual's identity.

Additional objects of the present invention are: to advance a method for simplifying the use of one's fingerprint to authenticate one's identity via the Personal Choice Biometric Signature (PCBS) analogous to one's written but fraud-prone signature of the past; to facilitate the replacement of specially trained and experienced fingerprint identifying technicians with relative simple, ultra-small-sized and low cost device that can be manufactured in high volumes and thereby renders the task of fingerprint authentication simpler, less costly and less subjective to personal opinion; to safeguard the use of fingerprints to identify individuals from the illegal recovery of fingerprints and their subsequent fraudulent use.

Although the present invention still uses one's basic fingerprint as a means to authenticate one's identity (authentication and identification are hereinafter used substantially interchangeably), it departs significantly from the manner of its traditional utilization. Instead of using the entire inked impression of fingerprints ("rolled" or "flatly placed") and its associated characteristic features or patterns such as "arches", "loops" and "whorls" for identification purposes, only certain pre-defined partial fingerprints are used and they are designated herein as "linear signatures". They are so named because these linear signatures represent different linear (straight line segment) image scans of the ridges and troughs of a fingerprint all through its reference center. Two or more of these linear signatures, augmented by the incorporation of one's own choice in selecting which linear signatures and their respective application sequence, are used to authenticate an individual. This is likened to remembering a PIN number but instead of punching in the traditional 4-digit PIN, one replaces that with two or more simple and sequential "strokes" of one's index finger on a well-marked and contoured template. It is the choice of making any two or more out of many possible "strokes" and their respective sequence that in essence replaces the use of the PIN. We have in essence replaced the comparison of one's entire fingerprint with one's a priori stored counterpart for authentication with a much simpler procedure using the Personal Choice Biometric Signature (PCBS) discussed earlier for one's identification.

Unlike the prior art presented earlier, these linear signatures referred to above are not captured via the use of a linear or matrix array of sensors which are costly and whose numerous outputs are rather complex to process. Instead, only a single sensor located at the reference center of a well-marked and index-finger contoured template, which forms part of the Selective Partial-fingerprint Authenticator (SPA), is used. This template, an integral part of an SPA, is used to capture the a priori reference linear signatures of an individual according to his/her personally selected sequence (personal code) and that will constitute as his/her PCBS. At subsequent times one's PCBS, captured using the same or a structurally equivalent template portion of an SPA, will be used to uniquely authenticate the individual. The use of the well-marked and index-finger contoured template for both instances is to minimize the spatial variation of a particular straight line segment of one's fingerprint (linear signature) as seen by the single sensor of the SPA when the index finger moves over it. In addition, in order to simplify the capture of the PCBS, the template is designed to allow only two orthogonally oriented "strokes" of the index finger, arranged like the arithmetic "+" symbol. As will be explained in more detail below, there are only two grooves on the top surface of the template oriented 90 degrees to each other with the single sensor located at their intersection.

A novel algorithm formulated around the use of Discrete Fourier Transform (DFT) and Fast Fourier Transform (FFT) techniques as applied to the captured linear signatures is used to generate a unique Similarity Index (SI) from one's reference PCBS and one's subsequently submitted candidate PCBS. Based upon the value of the calculated SI, one's positive or negative authentication can be readily and quantitatively determined utilizing the reference and submitted candidate PCBS's of the individual. The pairs of proximity sensors materially assist in compensating for finger movement speed, thereby greatly narrowing the range of calculated SI values.

Thus the present invention, in addition to advancing the method of using only one's selected partial fingerprints for authentication, thereby giving the individual a PIN-like protection, also simplifies the procurement of the so-called linear signatures and the PCBS with the use of only one sensor located strategically at the reference center of a specially designed template which is part of the Selective Partial-fingerprint Authenticator (SPA). Furthermore a novel parameter called the Similarity Index (SI) is formulated and introduced applying DFT and FFT techniques on the linear signatures. This Similarity Index (SI) can be easily and quantitatively used to discern accurate similarity or dissimilarity from individual's submitted reference and candidate PCBS's for one's authentication, and the proximity sensors significantly contribute to this process.

BRIEF DESCRIPTION OF THE DRAWINGS

FIG. 3 depicts the scanning motion for a finger of an individual having a Personal Code {13};

FIG. 5 schematically shows details of a fingerprint sensor unit;

BEST MODE FOR CARRYING OUT THE INVENTION

Figure 1:
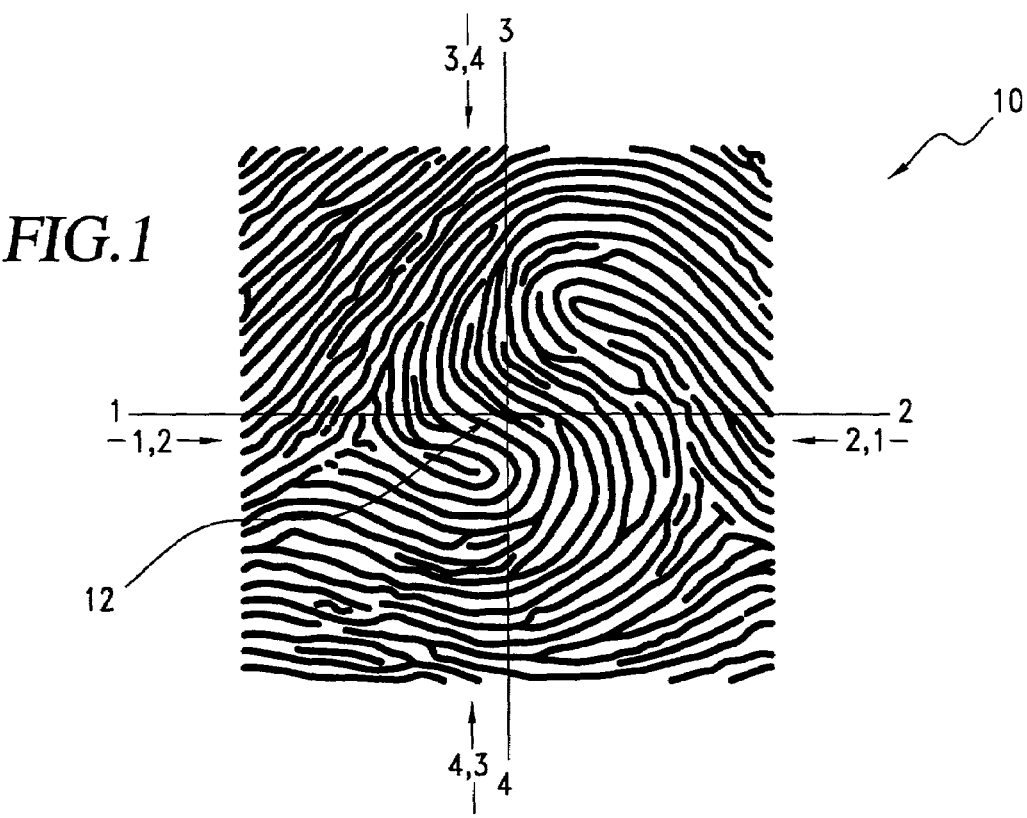
FIG. 1 depicts four linear signatures and their respective scanning direction, as superimposed over a typical fingerprint central portion.

Instead of using the entire inked impression of fingerprints and their associated characteristic keys for identification purposes, a preferred embodiment of the current invention employs a total of four straight-line segments (linear signatures) all crossing the nominal "reference" center of the fingerprint being processed. Referring to FIG. 1 there is shown a typical fingerprint central portion 10 over which are superimposed two straight lines which intersect at their midpoints to produce what are defined as four linear signature paths.

A horizontal line 1-2 running form West to East shows the path for taking a linear signature designated as 1,2 as depicted by arrows 1,2 (e.g. the path which originates at the western terminus 1 of the line 1-2 and ends at its eastern terminus 2). The same horizontal line 1-2 shows the path for taking a linear signature designated as 2,1 as depicted by arrow 2,1. Clearly, this second linear signature 2,1 will produce the same fingerprint data as the previous linear signature 1,2 but in reverse order. Similarly, a vertical line 3-4 running form North to South shows the path for taking a linear signature designated as 3,4, as depicted by the arrow 3,4 (e.g. again the path which originates at the northern terminus 3 of the line 3-4 and ends at its southern terminus 4), and, the same vertical line 3-4 shows the path for taking a linear signature designated 4,3 as depicted by the arrow 4,3. Also as before, this linear signature 4,3 will produce the same fingerprint data as the previous linear signature 3,4 but in reverse order.

Alternately stated, the two (illustratively) lines 1-2 and 3-4, when displaced 90 degrees (illustratively) apart and arranged to centrally intersect give rise to four possible orientations or linear signature designations. When any two of these four are selected in a particular sequence (by the individual being authenticated, for example), a total of 16 possible combinations are available resulting in a unique PIN-like capability. This is accomplished even while using only partial fingerprint data, which in itself is an additional security level capability. A much higher security level can be achieved by selecting any N of the four possible orientations or linear signature designations in a particular sequence. The total possible combinations available will then equal to 4 to the Nth. For example, when the value of N is 4, a total of 256 possible combinations are available. When the value of N is 6, a total of 4,096 possible combinations are available. Thus if one selects N equal to 6, the level of security is almost equivalent to (within a factor ~2) that for a 4-digit PIN.

Figure 2:
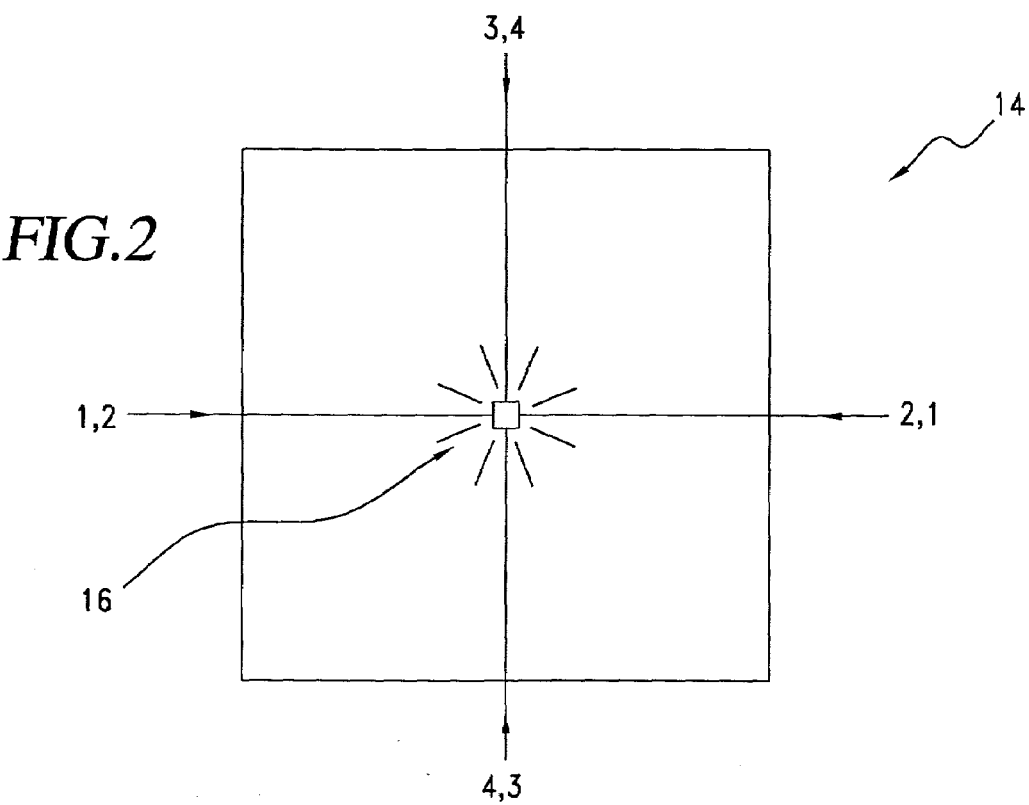
FIG. 2 depicts a simplified identification template device with the four scanning directions well delineated, and a sensor unit at the center of the template.

Referring now to FIG. 2 there is shown a simplified representation of an identification template device 14 showing the four linear signatures and their scanning directions, as well as a centrally located single sensor element 16 at the template center. The present invention encompasses the storage of the four linear signatures for an individual's fingerprint (thumb or any finger) as uniquely belonging to an individual. In a preferred embodiment, it is contemplated that the index finger be used and that a right-handed person uses his right index finger and a left-handed person uses his left index finger. However, in order to uniquely identify that individual, one only uses N out of the 4 to the Nth possible combinations of N linear signatures in sequence as selected by that individual (and/or and associated entity) for their identification or authentication. For example, if one selects a value for N equal to 2, then these two so-selected sequential linear signatures by the individual are referred to as the individual's Personal Code.

In order to represent an individual's Personal Code in a more user-friendly manner, simply as a two digit number (here we set N=2 for clarity of explanation), one translates the linear signatures as previously described with the assistance of and reference to FIG. 3. Thus if one's Personal Code is selected as 1,2 and 3,4 (e.g. first West to East, then North to South) the two-digit code will simply be {13} or thirteen. And if one's Personal Code is selected as 1,2 and 1,2 (e.g. West to East twice), then the two digit code will be {11} or eleven, and so on. Each single digit in bracket corresponds to what was described above as the starting terminus of the straight line, and the two digits in brackets represents the unambiguous and simplified designation sequence of the two number Personal Code.

The authentication methodology of the current invention calls for an individual to first indicate his Personal Code and the subsequent authentication of that individual is based only upon the use and comparison of these two selected sequence linear signatures with the corresponding sequential two that had been previously stored. For clarity, the authentication process is illustrated in FIG. 3 for a Personal Code {13}, thirteen. Note that the first of the two sequential scans {1} is from West to East, the second scan {3} is from North to South. Those contoured indentations or grooves, shown in dashed lines surrounding each track or path, help guide finger movement to minimize spatial variations from scan to scan. Note also that the finger must always point upwards (to the North) as shown. The sixteen two-digit Personal Codes (for N=2) available are, using the bracket scheme described above: {11–14}, {21–24}, {31–34} and {41–44}.

The current invention is in essence a two step process. Step one involves the generation and storage of a set of four non-inked partial fingerprint data (e.g. N=2) for an individual in the format of four linear signatures 1,2; 2,1; 3,4 and 4,3 previously designated and described, or their simplified equivalents {1} through {4} respectively, as shown in FIG. 3. These are considered as the reference linear signatures. This step may be likened to obtaining an individual's a priori inked fingerprint impressions in the traditional sense but without the use of ink, and of course, using only partial fingerprint data.

Step two involves the actual taking and processing of two sequential non-inked linear signatures (e.g. for N=2) of an individual according to his supplied Personal Code (these are considered as the candidate linear signatures), for comparison with the corresponding two sequential linear signatures that are stored, at the time of the authentication process. Step two will typically be carried out at a point-of-sale terminal, ATM, or other authentication venue. The authentication is affirmative if there is deemed sufficient match between the two sets of sequential linear signatures. Otherwise the authentication is negative, and the proposed transaction is denied.

It is evident from the description above that step one of the two processes entailed in the current invention can be afforded a rather sophisticated measurement setup without too much concern about cost and size constraints. This measurement equipment could be designed to scan linearly (in a substantially straight line) with known spatial scanning speed in two different directions all passing through a well-defined fingerprint "reference" center, the lines each separated by an angle equal to 90 degrees. Since two of the four linear signatures are basically the same data except for scanning in the opposite directions, only two such directional scans suffice to generate the four linear signatures with the individual's index finger held stationary and its center coincident with the reference center of the scanning surface (template) of the equipment. The scanning speed information is important for the subsequent pro-rating in time of the relevant stored linear signatures in order to match those generated by the individual at the time of authentication or identification. Such a pro-rating of the scanning speed in time by the appropriate software installed in the processor of the hardware for generating the linear signatures of the individual at the time of authentication eliminates the finger motion speed dependence on the generated linear signatures as will be explained in more detail below.

Step two of the process for implementing the present invention is accomplished by a Selective Partial-fingerprint Authenticator SPA device that will procure or generate two (for N=2) or more (for N>2) candidate linear signatures of the individual corresponding to his entered Personal Code at the time of authentication. The SPA device also holds the four reference linear signatures and other relevant information of the individual to be authenticated. Furthermore the SPA holds a microprocessor installed with appropriate software for processing the generated authentication information (here the two or more linear signatures) during an authentication process in order to generate an acceptance signal based upon the result of a sufficient positive or insufficient or negative match. In principle such an SPA device can take many forms with varied complexity dependent upon the purpose or application for which it is to serve. In any event this device cannot afford the type of sophistication and luxury installed in the measurement equipment used in step one of the process where only a few equipment units would suffice to generate all the reference linear signatures needed for use with this invention.

One of the ideal applications for the current invention is a security device employed along with an ordinary non-secure card to simply identify an individual (name and ID number of an individual only) for security purposes to control access to restricted area or restricted information. One example is to authenticate workers entering their workplaces. Here using the non-secure identification card (either in the form of a magnetic card or smart card) the worker enunciates who he or she is and then has to provide his Personal Choice Biometric Signature (PCBS) or linear signatures according to his Personal Code submitted earlier to his employer in order to get access to the workplace. Another more relevant and opportune application is to authenticate workers at airports getting access to restricted areas in view of the country's heightened security concerns.

Figure 4:
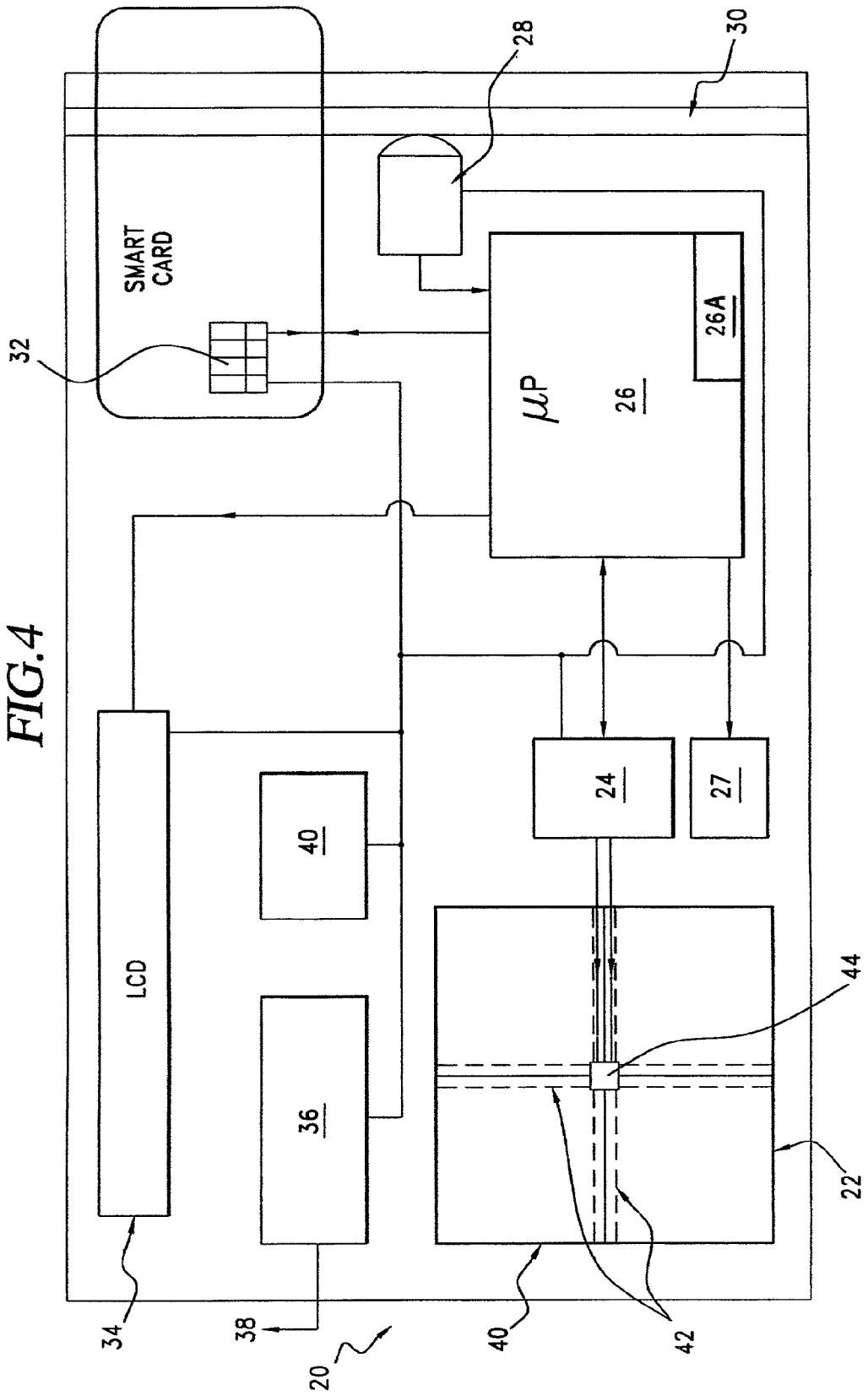
FIG. 4 is a simplified block diagram for the Selective Partial-fingerprint Authenticator (SPA) including additional proximity sensor signals processing software according to the present invention.

For these specific applications, the SPA device suitable for use in step two of the two-step process is shown in block diagram form in FIG. 4. The blocks of an SPA device 20 as depicted include a scanning device 22, a sensor driver/signal preprocessor circuit 24, a microprocessor 26 complete with its CPU, ROM, RAM and I/O units, a magnetic reader head 28 with the slider track 30, a smart card contact receptor 32 or an RF receiver (optional and not shown), an LCD indicator 34, power supply circuit 36 with external AC cord 38 and a battery 40 for standby power in the event of a power failure. An output circuit 27 driven from the microprocessor 26 provides signals to an external control unit (not shown), which output circuit 27 may employ wired or wireless (e.g. via RF) channels in order to perform a specific external function such as the unlatching of a lock in addition to the "positive authentication" indication by the LCD indicator 34.

With the exception of scanning device 22 and the sensor driver/signal preprocessor unit 24, the rest of the building blocks in the SPA device 20 are straightforward and known to those skilled in the art pertaining to the current invention. Therefore, the details of operational interactions between the microprocessor 26, its output display LCD 34, its smart card input receptacle 32 and power sources 36 and 40 etc. are not described further in the interests of brevity, other than to note that the processed representation of the linear partial fingerprint sequences (both reference and candidate) may be stored in the ROM and/or RAM portions of the microprocessor 26. The scanning device 22 further comprises a template 40 with two sets of contoured and indented scanning tracks, of which track 42 are typical, and a sensor unit 44 located at the center of the template 40. The design details for the template 40 and its associated scan tracks 42 correspond to the features previously depicted in connection with the description of FIGS. 2 and 3. Thus the sensor unit 44 is located at the fingerprint center as previously shown. The two sets of scanning tracks 42 correspond to the scanning directions 1,2 and 3,4 of FIG. 2. The dashed lines surrounding the tracks 42 additionally indicate that the tracks have an operational width set so as to alleviate finger alignment problems during the authentication as well as to mitigate software requirements.

The structural and functional details of the sensor unit 44 are described with reference now to FIG. 5. The sensor unit 44 comprises a special fixture (slab) 46 with a very small aperture 48 on its top surface 50 and a conical cavity 52 with an optically opaque surface 54. The conical cavity 52 opens up at its bottom 56 to accommodate a small header 58 (e.g. TO-18) equipped with a specially designed header can 60 which serves to hermetically seal the devices (LED and silicon photodiode) die-attached onto the top surface of the header 58. The header can 60 is equipped with a thin transparent window 62 made out of quartz or sapphire for optical radiation to pass into and out of the space 64 formed between the top surface of the header 58 and the bottom side of the header can 60. The header can 60 is further equipped with an small aperture tube 66 on its top so as to provide an aperture stop 68 for the radiation emitted by a light-emitting-diode (LED) 70. Die-attached onto the top of the header 58 are an LED 70 and a ring or donut-shaped silicon photodiode 72 encircling the LED 70. The electrical leads 74 of the silicon photodiode 72 are connected to the signal preprocessor portion of the circuit 24 (of FIG. 4) and the electrical leads 76 of the LED 70 are connected to the sensor driver portion of circuit 24. Also shown in FIG. 5 is the previously described template 40 being butted against by the top 50 of the slab 46 with the bottom side of an individual's finger 78 showing the ridges and troughs, of which the two shown as 80 are typical, in touch with the other side of the template 40.

Figure 6:
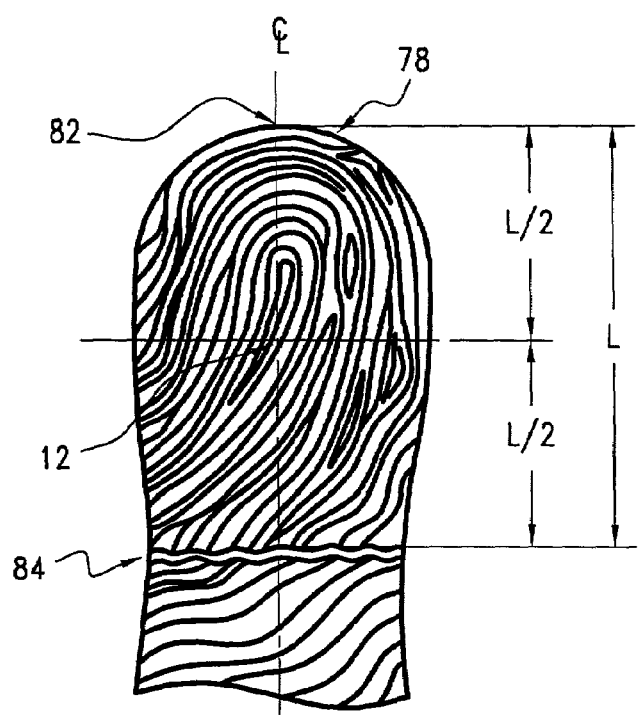
FIG. 6 depicts the definition of the fingerprint reference center of the bottom side of an individual's finger.

The sensor unit 44 is used to procure linear signatures for the individual when his finger (bottom side down) moves along any one of the four possible scanning tracks 42 at the time of authentication. The so-called fingerprint reference center (12 of FIG. 1) is ideally placed in the center of the contoured and indented track as the finger moves along the desired track. With brief reference to FIG. 6, the so-called fingerprint reference center is defined vertically (from North to South) as the midpoint between an apex 82 and the first break 84 of the prints and laterally (East to West) as the midpoint of the finger 78.

Figure 7:
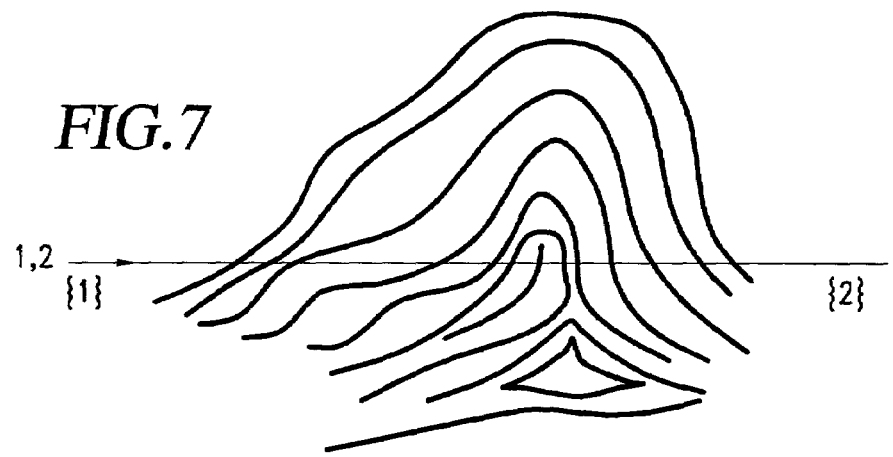
FIG. 7 shows a typical fingerprint ridge and valley pattern in simplified form along a scanned direction as illustrated.
Figure 8:
FIG. 8 depicts the linear signature in analog form, as sensed by a fingerprint sensor unit of FIG. 5 corresponding to the scanned direction of FIG. 7.

As the finger 78 moves across the contoured and indented track as was described in connection with FIG. 3, over the top aperture 48 of the slab 46, chopped (e.g. at a frequency of 3.03 kHz) and quasi-collimated radiation emanating from the LED 70 (as driven by driver circuit 24) through the apertures 68 and 48 will illuminate the bottom contour of the finger 78. The use of a specifically chopped radiation is needed in order to suppress the influence of stray background radiation from the surroundings and greatly improves the signal-to-noise (S/N) performance of the sensor unit 44. The reflected radiation will be detected by the annular silicon photodiode 72 located beneath the aperture 48. The amount of reflected chopped radiation received by the photodiode 72 in essence will map out the topographical contour of the fingerprint with the ridges reflecting more light and the troughs less. FIG. 7 shows a typical fingerprint ridge and trough pattern of a fingerprint along a typical scanned direction 1,2 (for example) with the concomitant linear signature produced in (analog form) developed by the sensor unit 44 and processed by circuit 24 shown in FIG. 8.

In addition to providing the appropriate driving pulses of a particular designed frequency to the LED 70, the circuit 24 of the SPA 20 (of FIG. 4) digitizes, after filtering and amplification, the received analog signal waveform from the photodiode 72. This amplitude-digitized waveform is then passed on to the microprocessor 16 for further processing by a novel software algorithm (to be described below) stored in same. A so-called similarity index (SI) is generated from the processed candidate and reference linear signatures which is then used to simply and accurately authenticate the individual whose reference linear signatures are submitted and stored earlier in the SPA 20.

Assuming that an individual has a priori his four linear signatures taken and his Personal Code duly selected and provided to proper authorities, as for example his employer, then in operation of having his identity subsequently authenticated, he has to first provide his identity (name and ID number) to the SPA device via the use of a magnetic card using slot 30 or a smart card. He then waits for the ready signal from the SPA unit 20 through the latter's LCD indicator 34 to scan his finger according to his Personal Code. The rest of the operation is self-contained and carried out by the SPA 20 without further intervention by the individual. A successful authentication of the inndividual will first br indicated by the LCD indicator 34 followed by appropriate functions to be performed by the security sentinel unit such as the unlatching of a lock, the opening of a gate, etc.

The novel software algorithm developed for the current invention is best described using an alternate embodiment of the present invention where the two-step process described above is combined into just one step. In other words, both the reference and candidate linear signatures referred to earlier of the individual to be authenticated will be procured with the same or functionally similar hardware device, namely in this present case, by the Selective Partial-fingerprint Authenticator (SPA). In this preferred embodiment, an individual's "reference" Personal Choice Biometric Signature (PCBS), for example two linear signatures with a particular sequence as discussed earlier, will first be obtained via an SPA device at an appropriate location such as a credit card issuing bank. During a subsequent authentication of the individual, e.g. at a point-of-sale terminal, ATM or other authentication venues, a functionally similar SPA device having one's "reference" PCBS stored a priori will be used to obtain one's "candidate" PCBS for comparison and subsequent authentication. The advantage of combining the two-step process into just one step is the fact that since the same type of SPA devices are used to procure both the "reference" and "candidate" PCBS's, the spatial variations of one's linear signatures will be kept to a minimum.

Figure 9A:
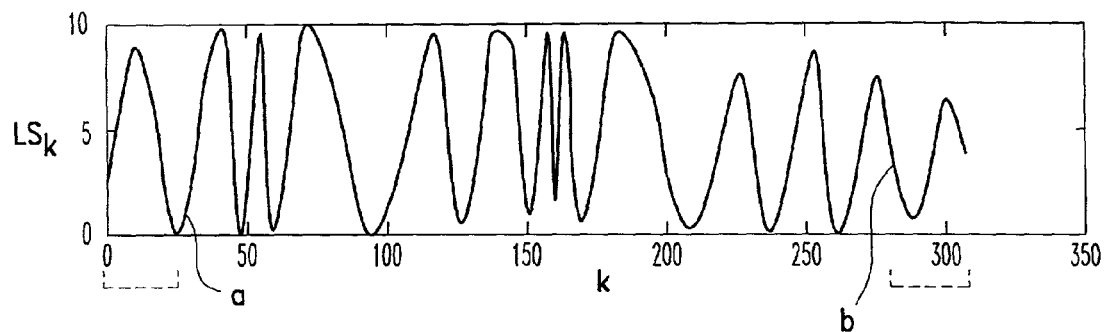
FIG. 9A depicts a complete linear signature of an individual as generated by an SPA device.

FIG. 9A is taken from an actual computer printout and shows a typical digitized linear signature of an individual obtained by using an SPA device for a WEST to EAST scanning direction, namely 1,2 or {1} (see FIG. 3). The ordinate "$LS_k$" denotes the linear signature reflected signal from the finger (underside) in arbitrary amplitude units as received by the silicon photodiode detector, and the index "k" in the abscissa and the subscript "k" in the ordinate denote digitized channel number ranging from "0" to "307" in FIG. 9A. In other words, the entire analog signal as a function of time received from the detector during the scanning of the finger is digitized into 308 channels each representing a fixed time period, e.g. in the present case, one millisecond. For the data shown in FIG. 9A, the SPA device has an aperture opening of 100 microns or 0.004".

Figure 9B:
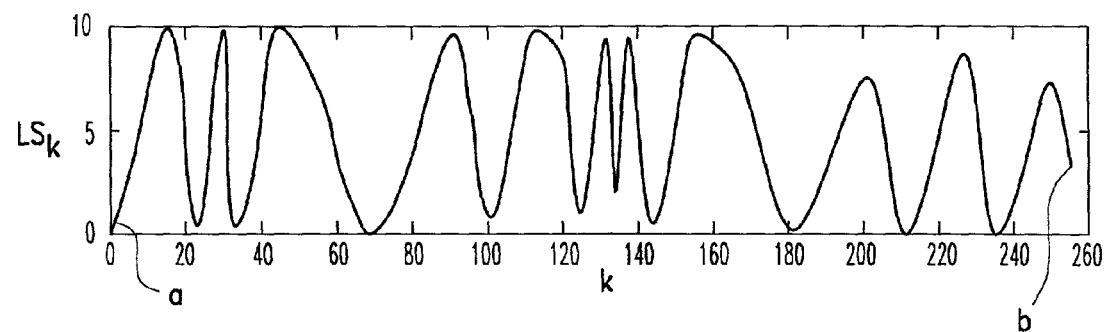
FIG. 9B depicts the linear signature of FIG. 9A after selected data from both edges of the finger have been deleted.

Because of the typical finger curvature at both edges of the finger, the data obtained from these edge regions are generally less reliable due to the finger's incomplete contact with the template, so a portion of the data is best deleted from the beginning and end of the digitized linear signature shown in FIG. 9A. When this is done, as shown in dashed lines in FIG. 9A and indicated by the points "a" and "b" of FIGS. 9A and 9B, the number of channels is now reduced from 308 to 256 as illustrated in FIG. 9B. FIG. 9B now represents a typical digitized linear signature to be obtained from an individual as both a reference and a candidate PCBS in the current invention. The authentication process for the individual involves the determination of whether an individual's reference PCBS is the same as an individual's candidate PCBS. Alternatively stated, if one's reference PCBS is found to be sufficiently similar to that of one's candidate PCBS, then the individual is considered authenticated.

Figure 10:
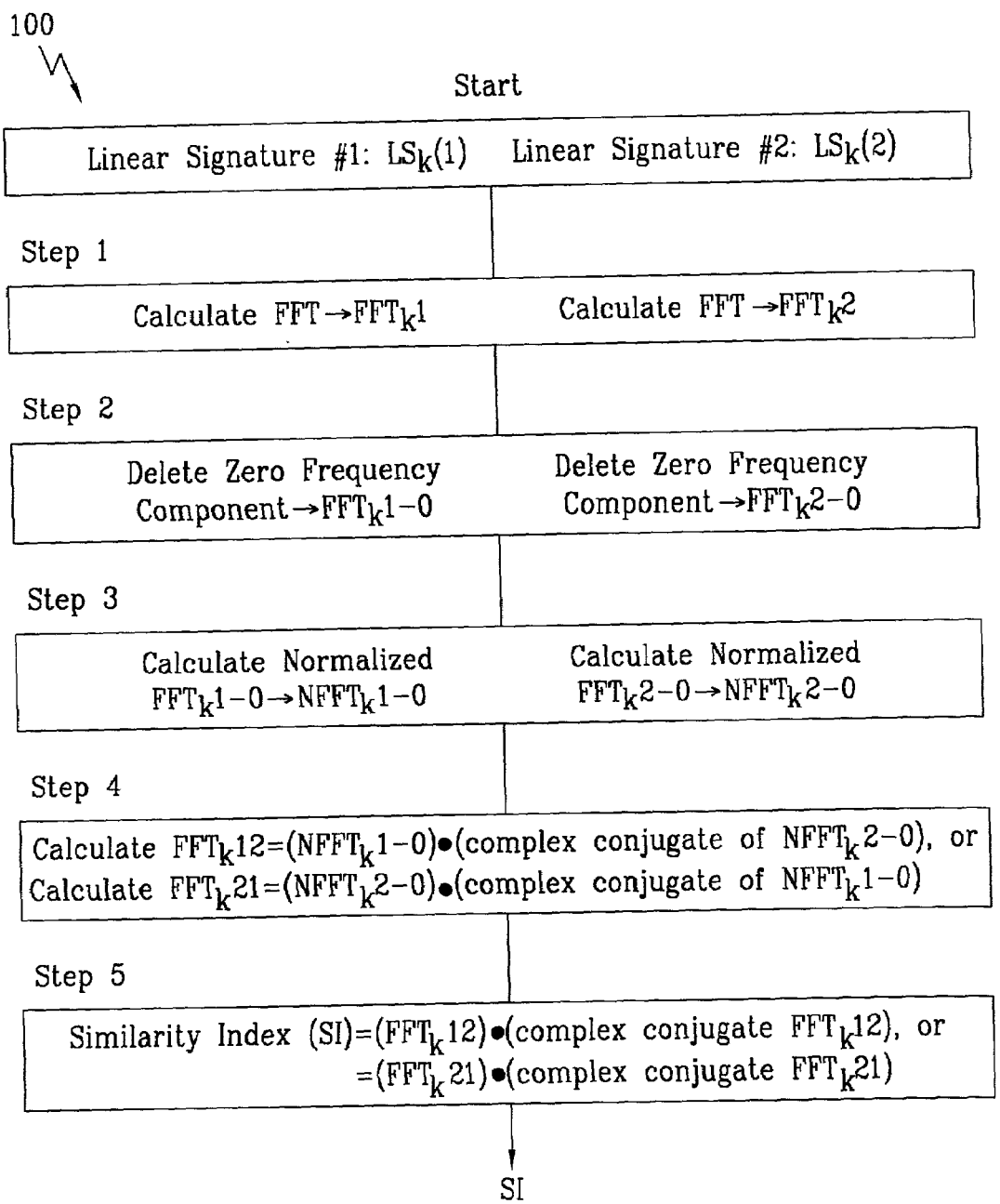
FIG. 10 is a flow chart showing the formulation steps for the Similarity Index (SI) method according to the present invention.

Referring now to FIG. 10, a novel methodology is advanced in the present invention in order to determine simply and reliably the similarity between two digitized linear signatures, as typically represented by FIG. 9B, for the purpose of authenticating an individual. The formulation of a Similarity Index SI is advanced following the procedural steps described by a flow chart 100. The method starts out by preparing two digitized linear signatures $LS_k(1)$ and $Ls_k(2)$, (described and shown in FIG. 9B above) which are to analyzed or compared for similarity. Step 1 of the formulation procedure for SI is to calculate the Fast Fourier Transform $FFT_k1$ and $FFT_k2$, respectively, for both $LS_k(1)$ and $LS_k(2)$ which are expressed and treated as column vectors having "k" rows and one element per row, again as shown in FIG. 9B. Note that both $FFT_k1$ and $FFT_k2$ are complex vectors.

Figure 9C:
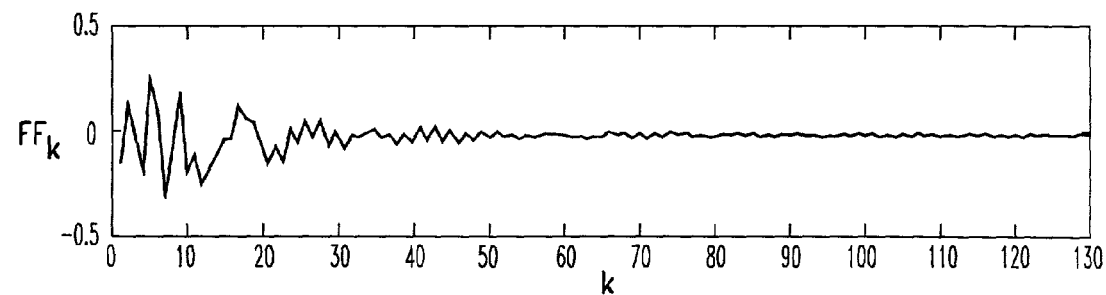
FIG. 9C shows the Fast Fourier Transform (FFT) of the linear signature shown in FIG. 9B.

Step 2 of the formulation procedure is to delete the zero frequency component from both of $FFT_k1$ and $FFT_k2$ obtaining, respectively, the vectors $FFT_k1$-0 and $FFT_k2$-0. Step 3 of the formulation procedure is to calculate the normalized Fast Fourier Transforms $NFFT_k1$-0 and $NFFT_k2$-0. This is done by dividing, respectively, $FFT_k1$-0 and $FFT_k2$-0 each by the square root of the dot product of itself (a complex vector) with its own complex conjugate. As an example, FIG. 9C shows the real part of a normalized complex vector $NFFT_k$, or $FF_k$, of a digitized linear signature $LS_k$ as shown in FIG. 9B plotted as the ordinate versus the digitized channel number "k" as the abscissa. Note that the channel number "k" plotted for $FF_k$ in FIG. 9C, extends only to 128 as the values for higher channel number above 60 or so are all very close to zero.

The process of actually comparing the similarity or the two original digitized linear signatures $LS_k(1)$ and $LS_k(2)$ starts in step 4 where the dot product of $NFFT_k1$-0 and the complex conjugate of $NFFT_k2$-0 is calculated to be $FFT_k12$ which is also a complex vector. It can readily be shown that $FFT_k12=FFT_k21$ which is the dot product of $NFFT_k2$-0 and the complex conjugate of $NFFT_k1$-0. Finally in step 5 one formulates the Similarity Index SI as the dot product of $FFT_k12$ with its complex conjugate. Alternatively, SI can also be formulated as and is equal to the dot product of $FFT_k21$ and its complex conjugate. Thus SI is deliberately formulated as a real number ranging theoretically from "0" to "1". However, since only the so-called Discrete Fourier Transform methodology is used to calculate the $FFT_k$'s from the digitized linear signatures $LS_k$'s (i.e., the integrating time is not extended to "+" and "−" infinity), the value of SI for a perfect match or similarity only approaches unity as a limit. Similarly, the value of SI for a perfect mismatch or dissimilarity only approaches zero as a limit. Notwithstanding, this novel Similarity Index SI can be used as a simply way to quantitatively ascertain the extent of similarity or dissimilarity between two linear signatures through their respective Fast Fourier Transforms and their subsequent formulation procedures to obtain SI. Thus if the derived value of SI lies closer to unity, the two linear signatures have more similarity and vice versa.

As a working convenience, the "0" to "1" range of SI is divided into three bands to facilitate quantifying the output results of the FIG. 10 formulation steps. An upper band including SI results in the range of 0.7 to ~1 is considered to be a positive authentication outcome, leading to a verification declaration, thereby confirming the identity of the individual in question. A lower band including SI results in the range of ~0 to 0.3 is considered to be a negative authentication outcome, leading to a lack of verification, or a non-authentication declaration for the individual whose linear signatures are compared. A central band (SI>0.3 and <0.7) is considered an indeterminate result, which has been found to be extremely unlikely due to the efficacy of the FFT/DFT method employed. Clearly, the upper and lower bands may be defined by a pair of predetermined and preset threshold values (an upper and a lower) and these values may be adjusted to increase the likelihood of a desired, well defined outcome commensurate with the actual implementation of the SPA devices employed.

In using the FFT representation presented above, the features or characteristics in real time of the linear signature $LS_k$ are reflected principally in the low frequency components of the $FFT_k$. The high frequencies of the $FFT_k$ reflect only the noise content of the linear signature $LS_k$. As used throughout, "k" here refers to the digitized channel number for $LS_k$ and $FFT_k$. For the sake of simplicity in the above formulation of the Similarity Index SI, we have only applied a uniformly weighted factor to both $FFT_k1$ and $FFT_k2$ without taking into consideration the effects of the weighted frequency contribution to content and noise. A better formulation for the SI will be to multiply both $FFT_k1$ and $FFT_k2$ with a non-uniform weighted factor, such as an exponentially decaying function, before forming the complex vector $FFT_k12$ or $FFT_k21$. Such a formulation for SI would yield an even more accurate similarity criterion for comparing linear signatures.

Figure 11A:
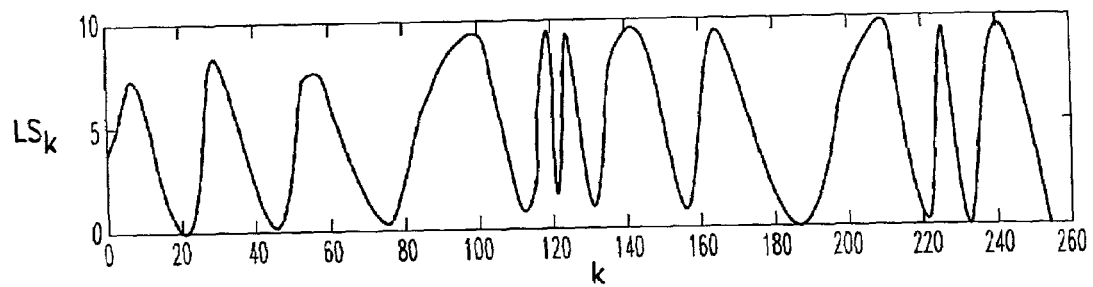
FIG. 11A shows a reverse linear signature (i.e. scanning in the opposite direction) of that shown in FIG. 9B.
Figure 11B:
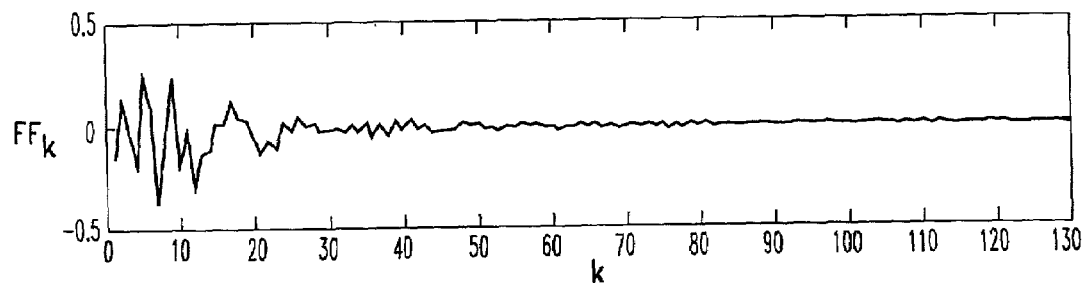
FIG. 11B shows the Fast Fourier Transform (FFT) of the linear signature shown in FIG. 10A.

FIGS. 11A and 11B show, respectively, the reverse linear signature $LS_k$ (i.e. scanning in the opposite direction) and its $FF_k$ (or $NFFT_k$) versus the digitized channel number "k" for that particular linear signature $LS_k$ similar to that shown in FIG. 9B. In other words, the linear signature shown in FIG. 11A is obtained with the SPA device when the finger is scanning in the EAST to WEST direction, 2,1 or {2} (see FIG. 3). Even though the linear signatures $LS_k$'s for the two directions appear similar, the value of SI when FIG. 9C is compared with FIG. 11B is calculated to be 0.0463 using the procedural steps of FIG. 10. Using the SI criterion as a measure of similarity match for linear signatures $LS_k$'s, the two are very dissimilar because the value is very much closer to zero, and clearly within the lower band as defined above.

Figure 12A:
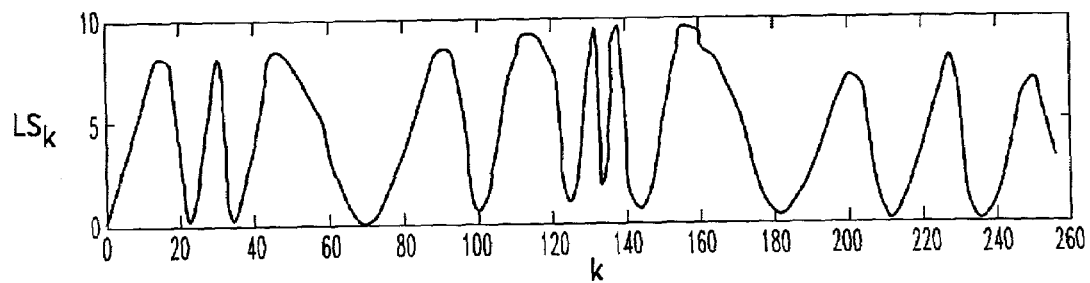
FIG. 12A shows the slightly modified linear signature of FIG. 9B by reducing the amplitude of some of the peaks and valleys.
Figure 12B:
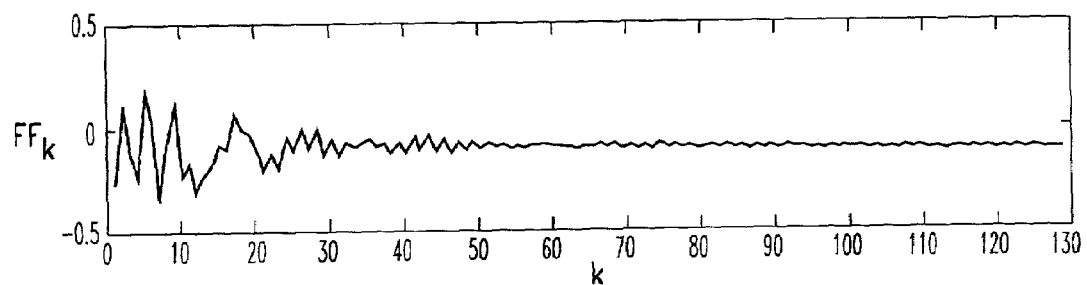
FIG. 12B shows the Fast Fourier Transform (FFT) of the linear signature shown in FIG. 12A.

FIGS. 12A and 12B show, respectively, a slightly modified linear signature $LS_k$ and its $FF_k$ (or $NFFT_k$) versus "k" for the particular linear signature $LS_k$ shown in FIG. 9B. In this case, we purposely vary the amplitudes of some of the peaks and valleys of the original linear signature $LS_k$ in FIG. 9B representing some signal variations that might happen in a real life situation even though the same procedure is used to obtain the data with a functionally similar SPA device. The SI value comparing the two linear signatures $LS_k$'s (FIG. 9B and FIG. 12A) is calculated to be 0.9861. Thus, based upon the SI criterion for matching, the two linear signatures are very similar because the value is much closer to unity, as indeed expected, and clearly within the upper band as defined above.

Figure 13A:
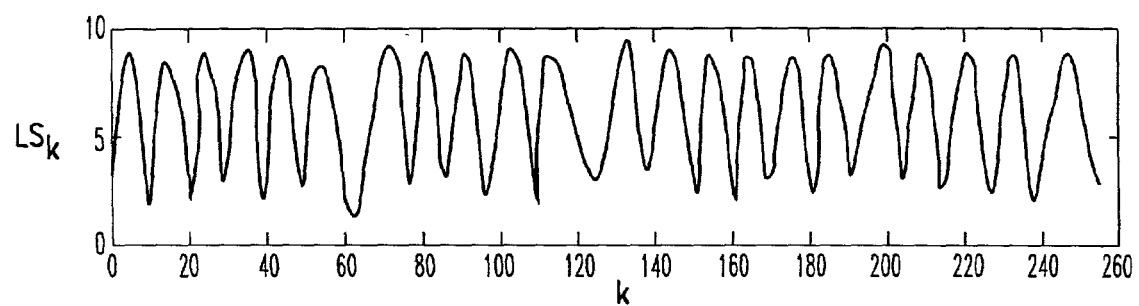
FIG. 13A shows a new and different linear signature from that shown in FIG. 9B.
Figure 13B:
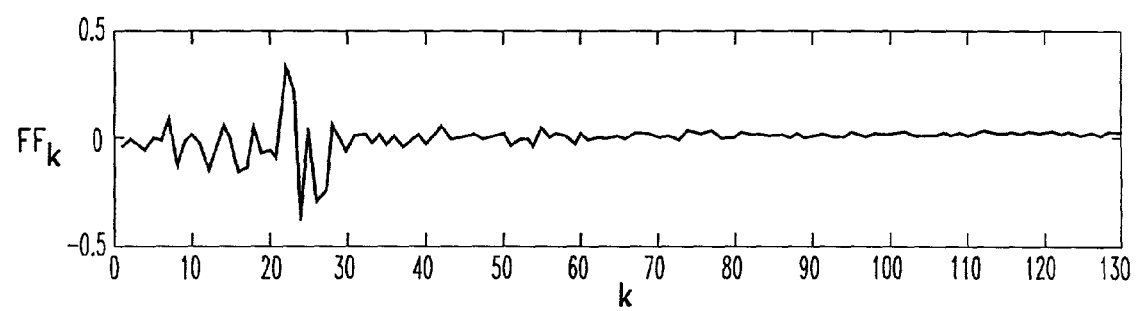
FIG. 13B shows the Fast Fourier Transform (FFT) of the linear signature shown in FIG. 13A.

FIGS. 13A and 13B show, respectively, a new and dissimilar linear signature $LS_k$ and its $FF_k$ (or $NFFT_k$) versus "k" As expected, the SI value between these two linear signatures $LS_k$ (see FIGS. 13A and 9B) is calculated to be 0.0373. Thus one can conclude from the SI criterion that these two linear signatures $LS_k$ are very dissimilar, as expected.

Figure 14A:
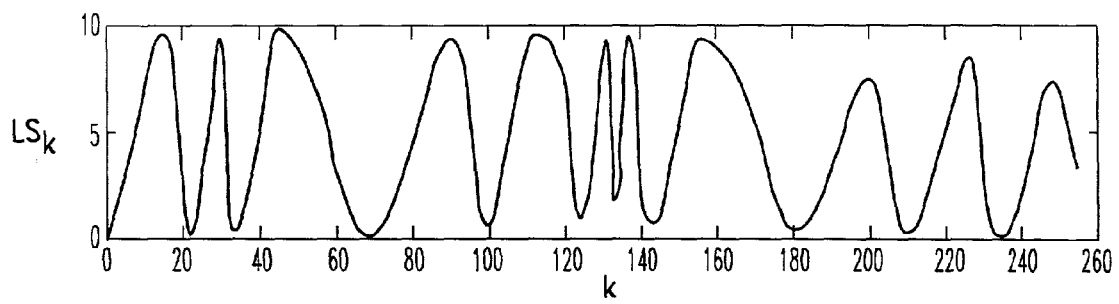
FIG. 14A shows a complete and non-truncated linear signature of that shown in FIG. 9B.
Figure 14B:
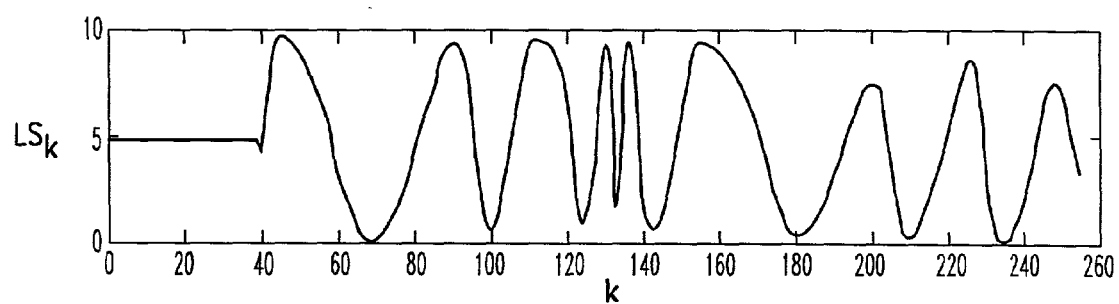
FIG. 14B shows the linear signature as shown in FIG. 4A with ~15% of the data truncated from its beginning.
Figure 14C:
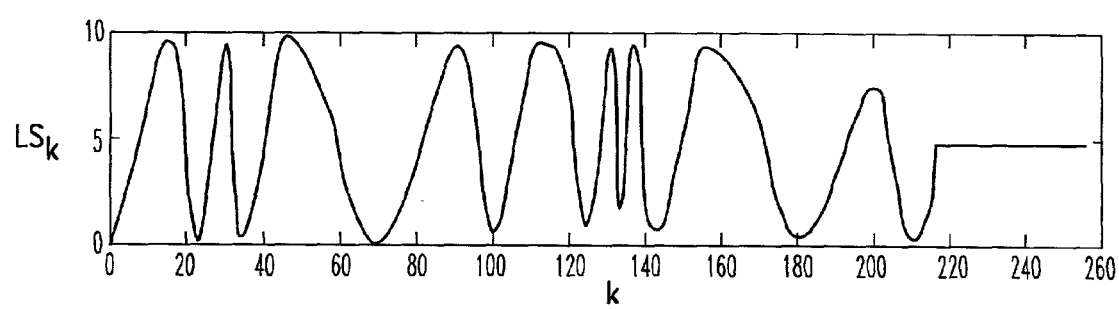
FIG. 14C shows the linear signature as shown in FIG. 14A with ~15% of the data truncated from its end.
Figure 14D:
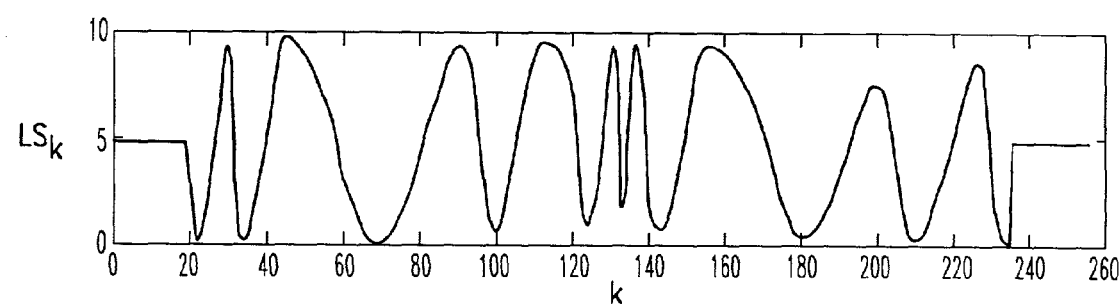
FIG. 14D shows the linear signature as shown in FIG. 14A with ~15% of the data symmetrically truncated from its beginning and end.

FIGS. 14A through 14D show the effect of the loss of certain amounts of data from the linear signatures $LS_k$ on the value of the subsequently calculated Similarity Index SI. FIG. 14A represents a reference linear signature with the data complete and undeleted. FIGS. 14B, 14C and 14D represent, respectively, the loss of over 15% of the contiguous data from FIG. 13A in the beginning, in the end and symmetrically from the beginning and the end. Note that in all four cases the scale of the time axis remains unchanged indicative of the fact that the finger movement speed through the sensor of the SPA unit is maintained relatively constant. The SI values for the three cases when compared with the reference linear signature shown in FIG. 14A are calculated respectively to be 0.8257, 0.8815 and 0.8637. Thus from the SI criterion of similarity matching, the effect of loss of data from the reference or candidate linear signatures is indeed small as long as the finger movement speed across the measuring sensor is maintained relatively constant.

Indeed linear signatures of the same finger measured by the same SPA unit but with different finger movement speeds (up to a factor of 10) can exhibit widely different calculated SI values. In general, the quality of the SI value used to ascertain similarity worsens as the finger movement speed deviates more and more from the nominal speed. In order to overcome this problem, the sensor in the SPA unit is always gated to sample the reflected light from the bottom of the finger at a constant interval or period, e.g. once every millisecond. Assuming now that for a nominal finger movement speed, a total of M data points are generated for each pass of the finger through the sensor that measures the reflected light. If the finger movement speed is faster than the nominal speed, the number of data points acquired for each pass will be smaller than M. If on the other hand, the finger movement speed is slower, the number of data points acquired will be greater than M.

The design of the SPA device unit specifies the range of acceptable finger movement speed so as to limit the maximum and minimum number of data points to be collected. In other words, the SPA unit will show an invalid signal light when the finger movement speed lies outside of this limit during data taking. If such a case occurs, the individual would have to re-pass his finger through the sensor until the SPA accepts the data to be collected. It is then up to the resident software algorithm to automatically scale the time axis for the reference and candidate linear signatures. If the measured candidate linear signature has less than M data points (finger movement too fast as compared with the nominal speed), the software algorithm will adjust to reduce the number of reference linear signature data points in order to achieve the same time axis scale for matching comparison with the candidate linear signature using the SI scheme. Similarly, if the measured candidate linear signature has more than M data points (finger movement too slow as compared with the nominal speed), the software algorithm will adjust to reduce the number of candidate linear signature data points in order to maintain the same time axis scale.

Referring now to FIGS. 15A through 15D, we consider now the effect of the aperture size of the SPA device on the quality of the SI similarity criterion. By doubling the aperture size from 100 microns (0.004") to 200 microns (0.008"), the measured linear signatures $LS_k$ versus "k" as shown in FIG. 9B and FIG. 13A become those shown in FIGS. 15A and 15C. Comparing these linear signatures $LS_k$ procured with a larger aperture (FIGS. 15A and 15C) with the same linear signatures $LS_k$ procured with a smaller aperture (FIG. 9B and FIG. 13A), one can see that although the overall signal has increased, the contrast (i.e. the height between the peaks and valleys) has decreased, which is as expected due to a larger integrating effect over the reflected surface experienced by the detector when the aperture becomes larger. The value of SI for matching the linear signatures $LS_k$ in FIG. 9B and FIG. 13A (smaller aperture) versus those in FIGS. 15A and 15C (larger aperture) shows only a slight difference, namely from 0.0260 to 0.0210, and still shows a great dissimilarity between the two respective linear signatures, leading to a lack of authentication declaration.

Figure 15A:
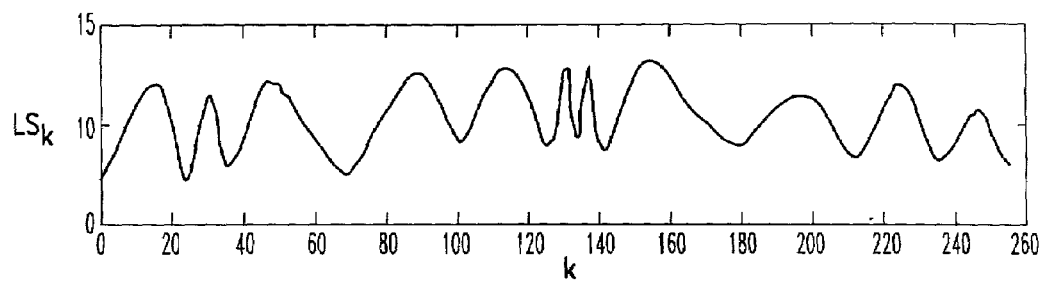
FIG. 15A shows the linear signature of that shown in FIG. 9B taken with a larger aperture of the SPA device.
Figure 15B:
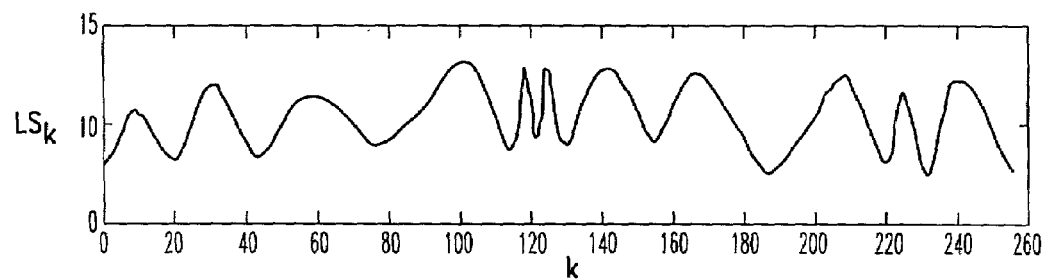
FIG. 15B shows the reverse linear signature (i.e. scanning in the opposite direction) of that shown in FIG. 15A.
Figure 15C:
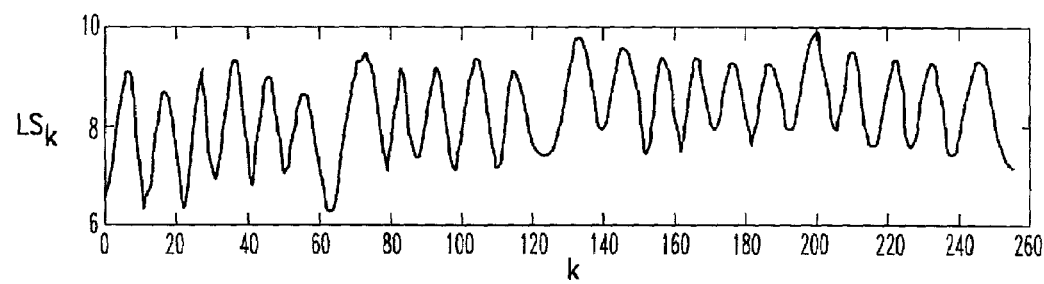
FIG. 15C shows the linear signature of that shown in FIG. 13A taken with a larger aperture of the SPA device.
Figure 15D:
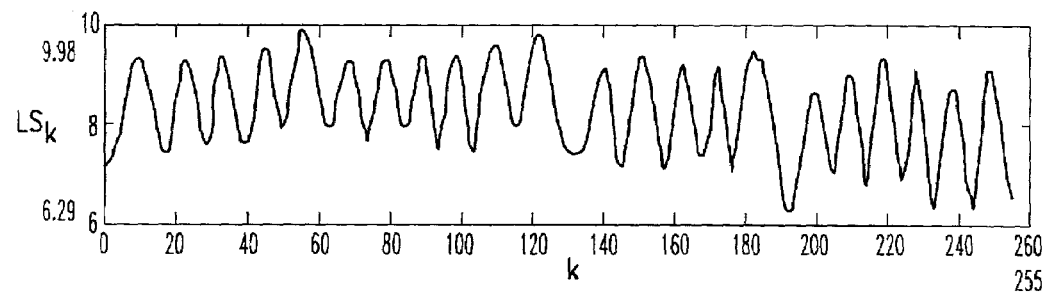
FIG. 15D shows the reverse linear signature (i.e. scanning in the opposite direction) of that shown in FIG. 15C.

FIGS. 15B and 15D are the reverse linear signatures (i.e. scanning in the opposite direction) of those shown in FIGS. 15A and 15C, all procured with a larger aperture in the SPA device. The calculated SI value for the linear signatures shown in FIGS. 15A and 15B is 0.0300. This compares with the value of SI for the same linear signatures but with a smaller aperture of 0.0460 and still showing great dissimilarity as expected. The calculated SI value for the linear signatures shown in FIGS. 15C and 15D is 0.112. This compares with the value of SI for the same linear signatures but with a smaller aperture of 0.0490 and still showing great dissimilarity.

Figure 16A:
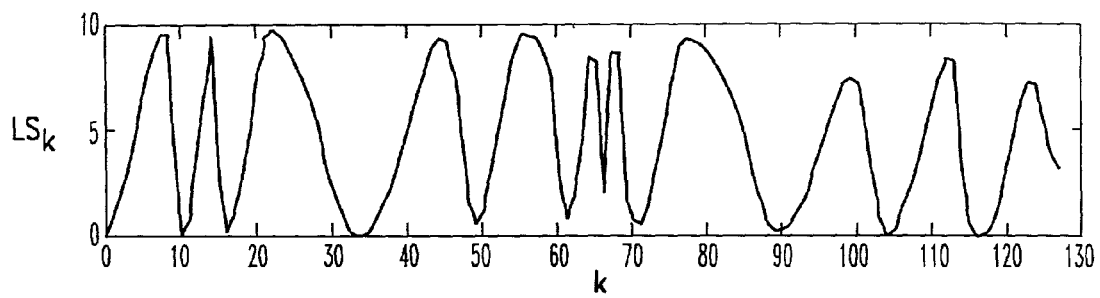
FIG. 16A is a reference linear signature of an individual taken with some nominal and acceptable finger movement speed.
Figure 16B:
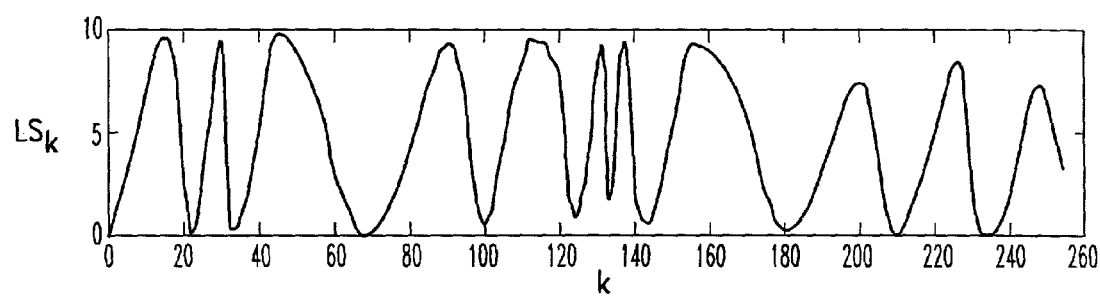
FIG. 16B is a candidate linear signature of the same individual as of FIG. 16A taken with half the nominal finger movement speed.
Figure 16C:
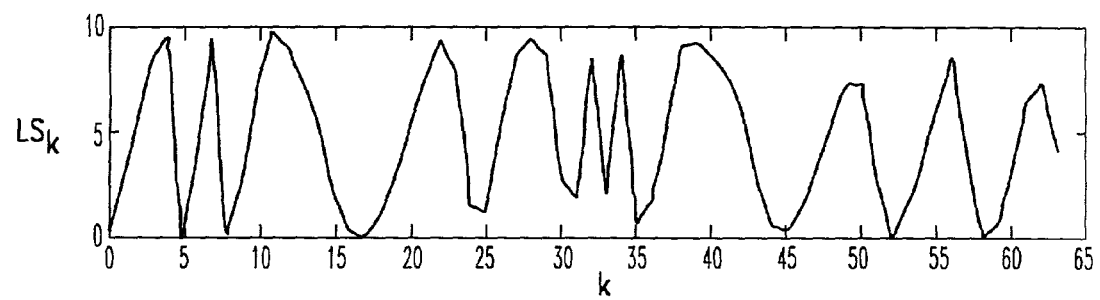
FIG. 16C is a candidate linear signature of the same individual as of FIG. 16A taken with twice the nominal finger movement speed.

Referring now to FIGS. 16A through 16C, note, as expected, that when finger movement is slower that the nominal speed, there will be more data points collected since each data point is always allotted a fixed time period, e.g. 1 millisecond. In the case shown in FIG. 16B, since the speed is too slow (e.g. half the nominal speed), there will be twice as many sample data points (260) collected as in FIG. 16A (130). Similarly in the case for FIG. 16C, since the speed is too fast (e.g. twice the nominal speed), there will be only half as many sample data points collected (65) as in FIG. 16A (130).

In order to invoke the Similarity Index methodology to compare the similarity of the too slow candidate linear signature shown in FIG. 16B with the nominally correct speed reference linear signature shown in FIG. 16A, one has to adjust the time scale of the candidate linear signature to be the same as that of the reference linear signature. In this case, this may be achieved by retaining one out of every two data points for the candidate linear signature shown in FIG. 16B. After this is done, the value of SI between the candidate linear signature taken at half speed and the reference linear signature taken is calculated using the formulation steps of FIG. 10 to be >0.95, indicating that the two linear signatures are very similar, and authentication may be declared.

To do the same for the too fast candidate linear signature shown in FIG. 16C, one may adjust the time scale of the the reference linear signature by taking out one of every two data points from the reference linear signature shown in FIG. 16A. After this is done, the value of SI between the candidate linear signature taken at twice the speed and the reference linear signature is calculated by the method of FIG. 10 to also be >0.95, again indicating that the two signatures are very similar, from which authentication can be declared.

Thus one can see that by adjusting the time scales for the reference and candidate linear signatures, the Similarity Index method of comparing similarity is rendered independent of the finger movement speed, even for the continuum of finger speeds normally encountered, as long as the number of sample data points are within the above described acceptable finger movement speed range. At this point it is worth noting that the several plots of linear signature amplitudes vs. "k" and their corresponding Fourier spectra plots resulted from actual computer printouts. During system evaluations, these several plots were carried out using a range of system parameters and the "k" indexes are therefore not necessarily drawn to exactly the same baseline system parameters. Thus, the number of data points of FIGS. 16A, 16B and 16C—130, 260, and 65—may not necessarily coincide with the number of data points of FIGS. 9A, 9B, or any of the other plots, and the "too fast" or "too slow" explanations in connection with FIGS. 16A–16C do not apply to or impact on the number or significance of the data points shown in the other plots.

From the discussion above, one can readily conclude that the Similarity Index SI advanced in the current invention and described earlier represents an excellent similarity matching indicator for linear signatures. This SI is relatively independent of small changes of peaks and valleys amplitudes in the measured linear signatures. It is also relatively independent of any loss of data in the acquired candidate linear signatures. By designing the corresponding Selective Partial-fingerprint Authenticator SPA with a fixed data sampling period, the finger movement speed across the sensor can be rendered completely independent with the aid of a simple scaling algorithm resident in the SPA. Furthermore, the time it takes to acquire either one's reference or one's candidate PCBS is very small (typically less than a second) and the time required to authenticate two PCBS's is also very small (~1 second) thus rendering this authentication technique very fast indeed. Since the SPA device unit used in conjunction with this PCBS methodology employs only one single LED source and one sensor element, it is very low-cost when compared with other complete fingerprint authentication methods which require the use of either a line or a 2-dimensional sensor array for capturing the complete candidate fingerprint.

Finally, as far as the level of security attainable using the current PCBS authentication methodology is concerned, it is a function of the number of linear signatures used (the number N defined earlier) and the probability that two individuals will have the same linear signature in any one of the scanning direction, namely {1}, {2}, {3} or {4} (see FIG. 3). Assuming that one out of 100 individuals has the same linear signature when scanned in a particular direction (e.g. for a value of SI=0.7 or higher), the security level reached with the use of two sequential linear signatures is already 1 in 10 to the 4th, the same as the PIN methodology widely in use today. However, the current SI methodology has the added security in the personal choice of 1 in 16 (assuming N=2) in picking any two sequential linear signatures for one's own authentication, thus the level of security reachable by the current invention is 16 times more secure than the PIN counterpart. If one cares to pick a higher number for N, e.g. N=4, then the security level is a factor of 2.56×10 to the 6th, more secure than the current PIN methodology.

In addition to its application as a security sentinel described above, the current invention has numerous other applications primarily in the security industry. These include locks of all kinds such as door lock, automobiles locks, safes etc. But one of the most promising applications is in the realization of the so-called biometric smart card discussed earlier in the prior art section of this patent application. In order to accomplish this here-to-fore unrealized capability, all the components contained in the SPA device as shown in FIG. 4, with the exception of the magnetic reader head 28 and smart card receptacle 32, have to be incorporated within the confines of a regular-sized credit card.

This can be done by first incorporating the sensor driver/signal pre-processor circuit 24 and the microprocessor 26 as part of the smart chip which is already resident in the smart card. The smart chip now takes over the functions of both the sensor driver/signal pre-processor 24 and the microprocessor 26. Alternatively, a MEMS-based ASIC chip combining all the components of the sensor unit 44 could also include the functions of the sensor driver/signal-processor circuit 24. The power supply circuit 36 and the battery unit 40 have to be replaced with the latest and fast maturing super-thin Power Paper Cell battery which could be easily incorporated within the size and thickness of an ordinary credit card.

Finally the LCD 34 indicator's function is replaced with an LED 70A (of FIG. 5) in the sensor unit 44 without altering its original illumination capability. The LED 70 is converted from a one-color into a "three-color" LED device 70A. The first color (red) is used as a blinking light operating at a very slow frequency like 0.33 Hz or once every three seconds. By a user simply blocking this blinking red LED light momentarily, this LED 70A will turn into a steady yellow color indicative that the card is ready to accept the linear signatures from the individual according to his Personal Code. This can be done because as the blinking red LED is blocked, the silicon photodiode will receive a sizable signal due to the sudden presence of a large amount of reflected light. If the submittal of the linear signatures by the individual according to his own Personal Code is accepted by the card, then the LED 70A will turn into a steady green color indicative that the holder of the biometric smart card has been authenticated and the smart card can now be accepted for financial (credit, debit, etc.) and other transactions. If the linear signatures are not accepted, the LED will turn back into a blinking red color again prompting the cardholder to repeat the authentication process. Three unsuccessful submittal of linear signatures by a cardholder will make the LED steady red and the biometric smart card will no longer be valid until it is reset by the issuer or a proper authority.

Figure 17:
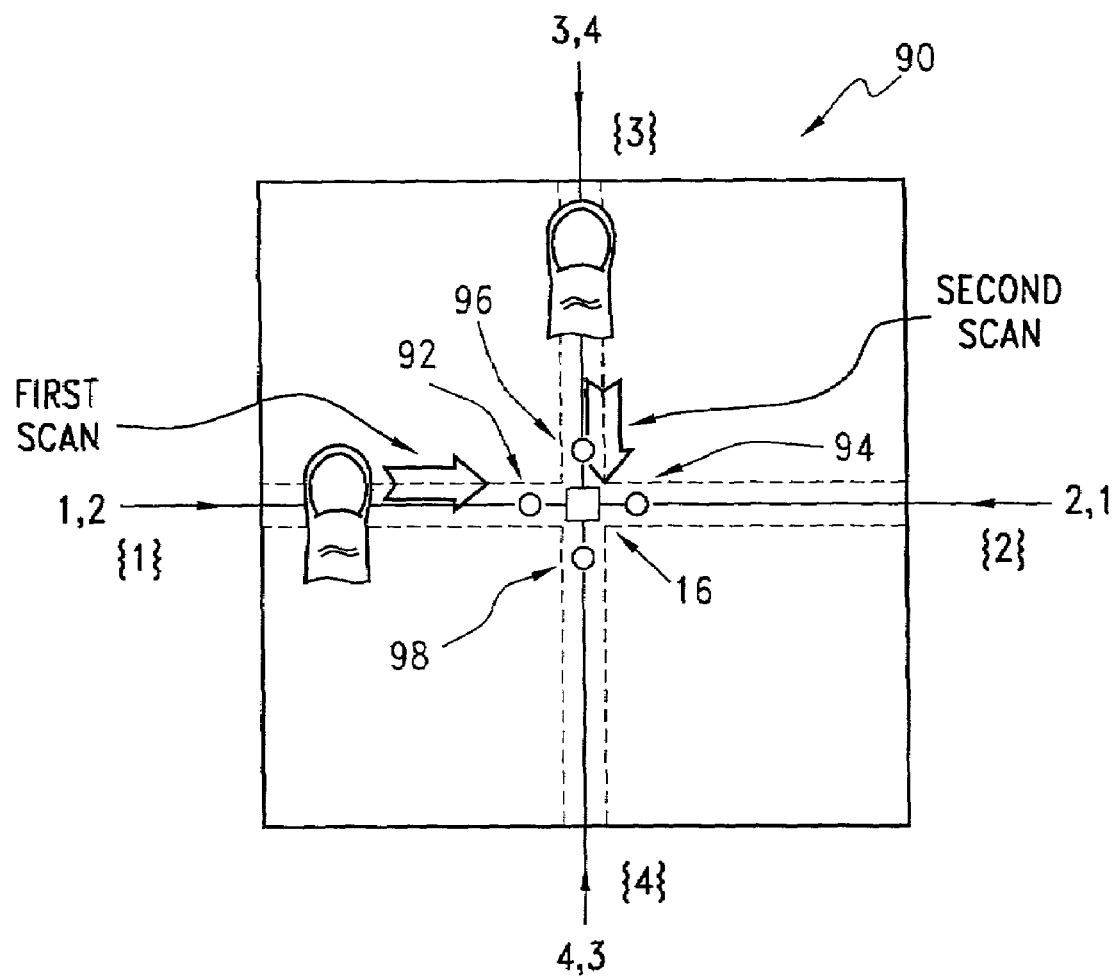
FIG. 17 depicts an alternate preferred embodiment of a template device including proximity sensors for improving the time scale adjustment of reference and candidate linear signatures.

Referring now to FIG. 17 there is shown an alternate embodiment of an identification template device which includes a number of proximity sensors for providing an improved time scaling capability for both reference and candidate linear signatures. Momentarily referring to FIGS. 2 and 3 will show the similarity of the basic structures involved, as well as the same two-stroke inputting function performed by both the devices of FIG. 3 and FIG. 17. In FIG. 17 an improved template device 90 is shown as having a first proximity sensor 92 located just 'west' of the centrally located single sensor element 16. As previously set forth, the full structural and functional details of sensor element 16 are described broadly as the scanning device 22 of FIG. 4, and in much more detail as the fingerprint sensor unit 44 of FIG. 5. A second proximity sensor 94 is located just 'east' of the sensor element 16, and third and fourth proximity sensors 96 and 98 are located just 'north' and 'south,' respectively, of the sensor element 16. So, two proximity sensors are located along each of the two orthogonal scan tracks in the form of the pair 92 and 94 along track 1,2 (or 2,1) and the pair 96 and 98 along track 3,4 (or 4,3).

The purpose of these proximity sensors is to assist in refining the procedure for compensating for finger movement speed, because as previously detailed "different finger movement speeds can exhibit widely different calculated SI values." Whereas the baseline procedure for accomplishing finger movement speed compensation (or the number of data points taken at fixed uniformly spaced intervals) is described in connection with the data shown in FIGS. 16A to 16C, the template device 90 along with its associated software allows a significantly better procedure. This is done, in part, by permitting the additional measurement of the total scan time period (TP) for acquiring a complete reference or candidate set of data. The knowledge of TP for the reference or candidate sets of data ensures the best possible registration for these measured linear signatures. Such an adequate registration for the measured data is important for carrying out the necessary computational steps in order to compare the data for similarity or dissimilarity.

Thus for each directional scan, say a first scan 1,2 (from west to east), the first proximity sensor 92 detects the first coming of the finger thereby informing the silicon photodiode of sensing unit 44 to start data collection. The second proximity sensor 94 indicates the end position of the finger when it is out of the measurement range thereby informing the sensing unit 44 to stop data collection. The two sensors thereby guarantee the complete collection for the linear signature data of the finger for a particular scan. However, a vitally important function of these two proximity sensors is to obtain the total scan time period (TP) for any complete data-taking scan. The knowledge of this TP value for each individual scan is crucial in achieving the best possible registration for the measured reference and candidate linear signatures as is explained in more detail below.

When one obtains the reference linear signature from an individual for a particular scan, we shall also always obtain a known TP value by means of signals from the two proximity sensors. The value of TP typically lies between 300 and 600 milliseconds. For simplicity we shall devote ourselves to only one scan here even though there could be more than one scan in an authentication process of an individual, depending on the security level desired. This known value of TP for the reference scan can be used to attain the best possible registration between any subsequent candidate linear signature with that of the reference. As already taught in the parent PCBS patent application, both the reference and candidate linear signature data are always taken at uniformly spaced time intervals "T" where T can be fixed at one, two or even four milliseconds, illustratively. By rounding off the total scan time period TP to the nearest number of T intervals, that number represents the number of channels associated with that particular linear signature scan. In other words:

Number of Channels, N=TP/T (rounded off to the nearest integer)

Now for every subsequent candidate scan, we also obtain a new TP, called $TP_c$ on account of the two proximity sensors per scanning track. Since the two proximity sensors for any scan track also assure that the linear signature data for the individual is always complete, we can compute the number of channels for this candidate scan or $N_c$. This $N_c$ is simply equal to $TP_c/T$, again rounded off to the nearest integer. Now in order to achieve ideal registration (or near ideal because of rounding off errors), one simply expands or compresses the number of channels $N_c$ of the candidate linear signature data to match (or conform) with the number of channels $N_r$ for the reference linear signature data. This procedure is generally the equivalent of, but quantitatively more exact than, the adjustment of the number of samples described in connection with FIGS. 16A–16C. After achieving the best possible registration or conformation between the measured reference and candidate linear signature data, one can then proceed to carry out the FFT-related operations on these linear signatures in order to calculate the similarity index SI.

For example, if the candidate channel number $N_c$ is larger than the reference channel number $N_r$, one proceeds via software to manipulate the measured candidate data by compressing it from $N_c$ channels to $N_r$ channels so that their number of data points conform. The same applies when $N_c$ is smaller than $N_r$. In this later case, one manipulates the measured candidate data by expanding it from $N_c$ channels to $N_r$ channels. Alternate closely related approaches may also be employed. A straight forward algorithm resident in the microprocessor 26 of FIG. 4 and labeled as block 26A performs the tasks of expansion or compression, as well as determining when to invoke which process. Once the number of channels for the candidate linear signature is rendered into the same number as that of the reference channel by either expansion or compression (i.e., conforming), the two linear signatures would have attained the best possible registration. Concomitantly, the effect of varying finger movement speeds in the taking of these data will have been eliminated.

Although the present invention has been described in terms of preferred and several alternate preferred embodiments, the invention should not be deemed limited thereto since other embodiments and modifications will readily occur to one skilled on the art. It is therefore to be understood that the appended claims are intended to cover all such modifications as fall within the true spirit and scope of the invention.

The invention claimed is:

1. A biometric method of authenticating the identity of an individual employing a preselected sequence of linear partial fingerprint signatures comprising the steps of:
   (a) obtaining a reference set of linear partial fingerprint signatures and a total scan time measurement associated with each linear signature in said reference set, and storing an electronic representation of the reference set and their associated total scan times in a comparison means, said reference set derived from two or more scans taken across predetermined paths on an individual's fingerprint;
   (b) generating a candidate set of linear partial fingerprint signatures and a total scan time measurement associated with each linear signature in said candidate set, and applying an electronic representation of the candidate set and their associated total scan times to a comparison means, said candidate set derived from at least two scans taken across correspondingly predetermined paths on that individual's fingerprint, the particular two of said at least two scans and the sequence of their application to said comparison means being selected so as to serve as a personal code; and
   (c) providing said comparison means for comparing each of said linear signatures of said reference set with each of the corresponding linear signatures of said candidate set based on conforming the total scan times of corresponding linear signatures, and for providing an affirmative response for a successful comparison and a negative response for an unsuccessful comparison.

2. The biometric method of claim 1 wherein said generating step includes providing a single element optical sensing device and said at least two scans are taken while said individual's fingerprint is moved across said sensing device.

3. The biometric method of claim 2 wherein said generating step further includes providing two pairs of proximity sensors, each pair positioned along a linear signature taking path including said single element optical sensing device such that said sensing device is disposed between said sensor pair for producing said total scan time measurements.

4. The biometric method of claim 1 wherein said generating step is accomplished by carrying out a timed series of sample data points to produce said candidate set of linear signatures, said data points taken at uniformly spaced time intervals and said comparison means includes total scan time measuring and conforming means such that the number of sample data points in said generated candidate set may be adjusted with respect to said obtained reference set in said comparison means to compensate for finger movement speed by using said total scan time measurements.

5. The biometric method of claim 1 wherein said comparing means is included in a microprocessor embedded within an identification/credit card.

6. The biometric method of claim 1 wherein said affirmative response is one or more responses selected from a group including an alphanumeric visual indicator, a color-coded visual indicator and a signal for controlling an external control unit.

7. A biometric system for authenticating the identity of an individual employing a preselected sequence of linear partial fingerprint signatures comprising:
   (a) means for obtaining a reference set of linear partial fingerprint signatures and a total scan time measurement associated with each linear signature in said reference set, and for storing an electronic representation of the reference set and their associated total scan times in a comparison means, said reference set derived from two or more scans taken across predetermined paths on an individual's fingerprint;
   (b) means for generating a candidate set of linear partial fingerprint signatures and a total scan time measurement associated with each linear signature in said candidate set, and for applying an electronic representation of the candidate set and their associated total scan times to a comparison means, said candidate set derived from at least two scans taken across corresponding predetermined paths on that individual's fingerprint, the particular two of said at least two scans and the sequence of their application to said comparison means being selected so as to serve as a personal code; and
   (c) said comparison means for comparing each of said linear signatures of said reference set with the corresponding linear signatures of said candidate set based on conforming the total scan times of corresponding linear signatures, and for providing an affirmative response for a successful comparison and a negative response for an unsuccessful comparison.

8. The biometric system of claim 7 wherein said means for generating includes a single element optical sensing device and said at least two scans are taken while said individual's fingerprint is moved across said sensing device.

9. The biometric system of claim 8 wherein said means for generating further includes two pairs of proximity sensors, each pair positioned along a linear signature taking path including said single element optical sensing device such that said sensing device is disposed between said sensor pair for producing said total scan time measurements.

10. The biometric system of claim 7 wherein said comparison means is included in a microprocessor embedded within an identification/credit card.

11. A biometric method of authenticating the identity of an individual employing a reselected sequence of linear partial fingerprint signatures comprising the steps of:
   (a) obtaining a reference set of linear partial fingerprint signatures and a total scan time measurement associated with each linear signature in said reference set, and storing an electronic representation of the reference set and their associated total scan times in a comparison means, said reference set derived from two or more scans taken across predetermined paths on an individual's fingerprint;

(b) generating a candidate set of linear partial fingerprint signatures and a total scan time measurement associated with each linear signature in said candidate set, and applying an electronic representation of the candidate set and their associated total scan times to a comparison means, said candidate set derived from at least two scans taken across correspondingly predetermined paths on that individual's fingerprint, the particular two of said at least two scans and the sequence of their application to said comparison means being selected so as to serve as a personal code;

(c) said generating step further including providing a single element optical sensing device and said at least two scans are taken while said individual's fingerprint is moved across said sensing device;

(d) said generating step further including providing two pairs of proximity sensors, each pair positioned along a linear signature taking path including said single element optical sensing device such that said sensing device is disposed between said sensor pair for producing said total scan time measurements;

(e) providing a said comparison means for comparing each of said linear signatures of said reference set with each of the corresponding linear signatures of said candidate set based on conforming the total scan times of corresponding linear signatures, and for providing an affirmative response for a successful comparison and a negative response for an unsuccessful comparison; and (f) wherein said affirmative response is one or more responses produced by a multipurpose indicator providing outputs selected from a group including an alphanumeric visual indication, a color-coded visual indication and a signal for controlling an external control unit.

* * * * *